3,642,823
AMINODIPHENYL-INDOLYL-METHANE DYE-
STUFFS AND DYEING AND PRINTING OF
POLYMERS AND COPOLYMERS OF ACRY-
LONITRILE OR ASYMMETRIC DICYANO-
ETHYLENE OR OF ACID-MODIFIED ARO-
MATIC POLYESTERS
Roderich Raue and Hans Peter Kühlthau, Leverkusen,
Germany, assignors to Farbenfabriken Bayer Aktien-
gesellschaft, Leverkusen, Germany
No Drawing. Filed Aug. 1, 1967, Ser. No. 657,500
Claims priority, application Germany, Aug. 3, 1966,
F 49,865, F 49,866; May 22, 1967, F 52,475
Int. Cl. C07d 27/56
U.S. Cl. 260—326.15                    13 Claims

ABSTRACT OF THE DISCLOSURE

This invention relates to aminodiphenyl-indolylmeth-
ane dyestuffs being free of sulphonic acid and carboxylic
acid groups. These dyestuffs can be used in the dyeing
and printing of certain polymeric products.

The present invention relates to valuable new amino-
diphenyl-indolyl-methane dyestuffs of the general formula

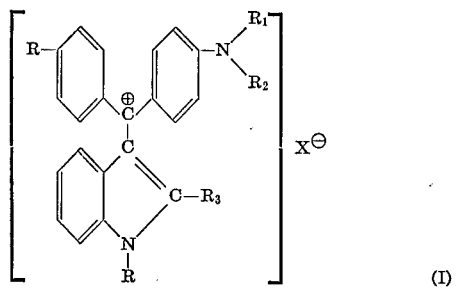

In this formula R denotes hydrogen, an alkyl, aralkyl
or aryl radical, a nitro, cyano, carboxylic acid ester group,
an optionally N-substituted carbonamide, acyl, alkylsul-
phonyl or arylsulphonyl group, $R_1$ represents hydrogen,
an alkyl, aralkyl, cycloalkyl or aryl radical, $R_2$ means
hydrogen, an alkyl, cycloalkyl or aralkyl radical, $R_3$ de-
notes hydrogen, an alkyl or aryl group, a carboxylic acid
ester group, an optionally N-substituted carbonamide
group or an alkoxy group, $R_4$ means hydrogen, an alkyl,
aralkyl, cycloalkyl or aryl radical, and X is an anionic
radical; the new dyestuffs may contain in the aliphatic,
cycloaliphatic and aromatic radicals, including the ben-
zene rings indicated by the above formula, further sub-
stituents (non ionic substituents), with the exception of
sulphonic acid and carboxylic acid groups. Non ionic sub-
stituents include, for example, lower alkyl and alkoxy
radicals containing 1–4 carbon atoms; aralkyl, such as
benzyl; aralkoxy, such as benzyloxy; aryl, such as phenyl,
and penyl radicals which are substituted by nonionic radi-
cals, e.g. chlorophenyl, methylphenyl, ethylphenyl, nitro-
phenyl, cyanophenyl, etc.; aryloxy groups, such as phenyl-
oxy; halogen substituents, especially chlorine and bro-
mine; carboxylic acid ester groups, especially caboxylic
acid methyl ester and ethyl ester groups; optionally N-
substituted carbonamide groups, preferably N-substituents
of lower alkyl groups which may be further substituted,
e.g. by Cl, Br and OH; the cyano, nitro, hydroxyl or
amino group; alkylsulphonyl, such as methylsulphonyl
and ethylsulphonyl; arylsulphonyl, such as benzene-sul-
phonyl and p-toluene-sulphonyl; acyloxy groups, such as
acetoxy and propionyloxy; acylamino groups, such as
acetylamino, propionylamino, ethyl-sulphonyl-amino,
methyl-sulphonylamino, benzoylamino, benzene, sulpho-
nylamino etc.; and acyl radicals, such as the benzoyl and
the acetyl radical.

The invention in particular concerns aminodiphenyl-
indolyl-methane dyestuffs being free of sulphonic acid
and carboxylic acid groups, of the formula

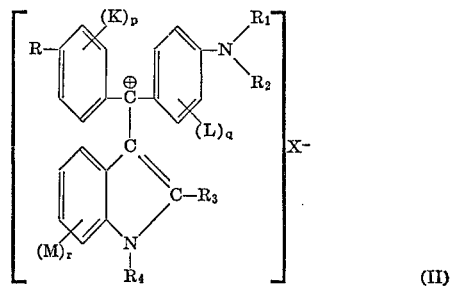

wherein R stands for hydrogen, an alkyl, aralkyl or aryl
radical, a nitro, cyano, carboxylic acid ester group, an
optionally N-substituted carbonamide, acyl or an alkyl-
sulphonyl or aryl-sulphonyl group, $R_1$ stands for hydro-
gen, an alkyl, aralkyl, cycloalkyl or aryl radical, $R_2$ stands
for hydrogen, an alkyl, cycloalkyl or aralkyl radical, $R_3$
stands for hydrogen, an alkyl or aryl group, a carboxylic
acid ester group, an optionally N-substituted carbonamide
group or an alkoxy group, $R_4$ stands for hydrogen, an
alkyl, aralkyl, cycloalkyl or aryl radical, X stands for an
anionic radical, K, L and M stand independently for
hydrogen or a substituent, $p$, $q$ and $r$ stand independently
for an integer ranging from 1 to 2.

One further group of particularly valuable dyestuffs
within the range of the new products of the Formulae
I or II corresponds to the formula

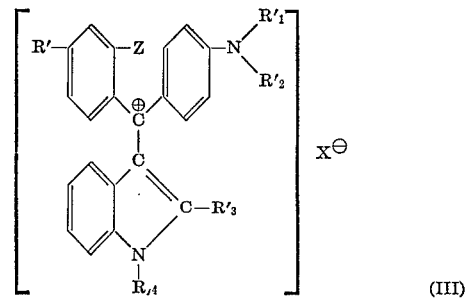

In this formula R' stands for hydrogen or for a lower alkyl
radical, especially methyl or ethyl, $R'_1$ stands for hydro-
gen, for a lower alkyl radical, especially methyl, ethyl,
propyl, butyl, a phenyl radical which may be further sub-
stituted by chlorine, bromine, lower alkyl or alkoxy radi-
cals, or for benzyl; $R'_2$ stands for hydrogen or for a lower
alkyl radical, such as methyl or ethyl, or for the benzyl
radical; $R'_3$ stands for methyl, phenyl or for phenyl sub-
stituted by chlorine, bromine or lower alkyl or alkoxy
radicals; and $R'_4$ stands for hydrogen, for a lower alkyl
radical, such as methyl and ethyl, and for benzyl; Z
stands for a halogen substituent, especially chlorine or
bromine, for a lower alkyl substituent, such as methyl,
ethyl or propyl, or for a lower alkoxy substituent, such
as methoxy or ethoxy; X represents an anionic radical.

The new dyestuffs are obtained when 4-aminobenzo-
phenones of the general formula

in which R, $R_1$ and $R_2$ have the same meaning as above, are condensed with indole derivatives of the general formula

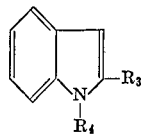

in which $R_3$ and $R_4$ have the same meaning as above, in the presence of acidic condensing agents to give dyestuffs of the Formulae I, II or III, selecting the starting components free of sulphonic acid and carboxylic acid groups.

The following aminobenzophenones are suitable as starting material for the production of the dyestuffs according to the invention, for example:

4-aminobenzophenone,
4-N,N-dimethylaminobenzophenone,
4-N,N-diethylaminobenzophenone,
4-N,N-dibutylaminobenzophenone,
4-N-methyl-N-hydroxy-ethyl-aminobenzophenone,
4-N-methyl-N-chloroethylaminobenzophenone,
4-N-methyl-N-cyanoethylaminobenzophenone,
4-N-ethyl-N-cyanoethylaminobenzophenone,
4-N-ethyl-N-chloroethylaminobenzophenone,
4-N-ethyl-N-hydroxy-ethylaminobenzophenone,
4-N-butyl-N-hydroxyethylaminobenzophenone,
4-N-butyl-N-chloroethylaminobenzophenone,
4-N,N-dihydroxy-ethylaminobenzophenone,
4-N,N-dichloroethylaminobenzophenone,
4-N-methyl-N-benzylaminobenzophenone,
4-N-ethyl-N-benzylaminobenzophenone,
4-N-phenyl-N-methylaminobenzophenone,
4-N-(4'-ethoxyphenyl)-N-methylaminobenzophenone,
4-N-(2'-ethoxy-phenyl)-N-methylaminobenzophenone,
4-N-(4'-chlorophenyl)-N-methylaminobenzophenone,
2-methyl-4-N,N-diethylaminobenzophenone,
2-chloro-4-N,N-diethylaminobenzophenone,
2-methyl-4-N-hydroxy-ethyl-N-ethylaminobenzophenone,
2-chloro-4'-N,N-dimethylaminobenzophenone,
2-bromo-4'-N,N-diethylaminobenzophenone,
3-chloro-4'-N,N-diethylaminobenzophenone,
4-ethyl-4'-N,N-diethylaminobenzophenone,
4-cyano-4'-N,N-diethylaminobenzophenone,
2-chloro-4'-N-phenyl-N-methylaminobenzophenone,
2-chloro-4'-N-(4''-ethoxyphenyl)-N-methylaminobenzophenone,
3-chloro-4'-N-phenyl-N-methylaminobenzophenone,
4-phenyl-4'-N-phenyl-N-methylaminobenzophenone,
4-ethyl-4'-N-phenyl-N-methylaminobenzophenone,
4-methyl-4'-N-(4''-ethoxyphenyl)-N-methylaminobenzophenone,
4-methyl-4'-N,N-dimethyl-aminobenzophenone,
4-methyl-4'-N-phenyl-N-methylaminobenzophenone,
4-cyano-4'-N,N-dimethylaminobenzophenone,
4-carbomethoxy-4'-N,N-dimethylaminobenzophenone,
4-methylsulphonyl-4'-N-phenyl-N-methylaminobenzophenone.

Suitable indole derivatives are, for example:

2-methylindole,
2-phenylindole,
2,5-dimethylindole,
2-methyl-5-chloroindole,
2-phenyl-5-methylindole,
2-phenyl-5-chloroindole,
1,2-dimethylindole,
1-methyl-2-phenylindole,
1,2,5-trimethylindole,
1,5-dimethyl-2-phenylindole,
1,2-dimethyl-5-chloroindole,
1-methyl-2-phenyl-5-chloroindole,
1-ethyl-2-methylindole,
1-ethyl-2-phenylindole,
1-ethyl-2,5-dimethylindole,
1-ethyl-2-phenyl-5-methylindole,
1-ethyl-2-methyl-5-chloroindole,
1-ethyl-2-phenyl-5-chloroindole,
1-benzyl-2-methylindole,
1,4,7-trimethyl-2-phenyl-indole,
1-n-butyl-2-phenylindole,
1-isobutyl-2-(4'-chlorophenyl)-4,6-dimethylindole,
1-cyanoethyl-2-methylindole,
1-cyanoethyl-2-phenylindole.

Suitable acidic condensing agents are, for example:

Hydrochloric acid, sulphuric acid, phosphoric acid, phosphorus oxychloride, thionylchloride, phosgene, zinc chloride, aluminium chloride, tin chloride or p-toluenesulphonic acid.

The reaction may be carried out in the presence or absence of an inert solvent. Suitable solvents are, for example, chlorobenzene, o-dichlorobenzene, toluene, xylene, benzene, ligroin, dioxan, cyclohexane, carbon tetrachloride, chloroform and, in some cases, also methanol, ethanol and acetone.

The reaction is generally carried out at an elevated temperature, e.g. at 40–160° C., preferably at 70–120°.

The anionic radicals $X^-$ can be inorganic as well as organic ions; there may be mentioned by way of example: $Cl^-$, $Br^-$, $I^-$, $CH_3SO_4^-$, $C_2H_5SO_4^-$, p-toluene-sulphonate, $HSO_4^-$, benzene-sulphonate-, p-chlorobenzene-sulphonate, phosphate-, acetate-, formate-, propionate-, succinate-, oxalate-, lactate-, maleinate-, crotonate-, tartrate-, $[BF_4]^-$, citrate-, $NO_3^-$, perchlorate-, $ZnCl_3$. The type of anionic radicals is of no importance for the properties of the dyestuffs provided substantially colourless radicals are used which do not impair the solubility of the dyestuffs in an undesirable manner.

According to another process, part of the dyestuffs according to the invention can also be obtained by condensing benzoyl indoles of the general formula

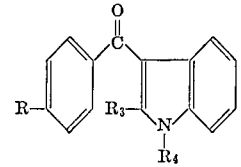

with aromatic amines of the general formula

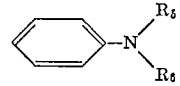

in which R, $R_3$ and $R_4$ have the same meaning as above, while $R_5$ stands for hydrogen, for an alkyl, cycloalkyl or aralkyl radical, and $R_6$ stands for an alkyl, cycloalkyl, aralkyl or aryl radical, in the presence of acidic condensing agents.

Examples of benzoyl indoles of the general Formula VI which are suitable for the production of the dyestuffs according to the invention include:

1-methyl-2-phenyl-3-benzoylindole,
1,2-dimethyl-3-benzoylindole,
1,2,5-trimethyl-3-benzoylindole,
1,5-dimethyl-2-phenyl-3-benzoylindole,
1,2-dimethyl-3-benzoyl-5-chloroindole,
1-methyl-2-phenyl-3-benzoyl-5-chloroindole,
1-ethyl-2-methyl-3-benzoylindole,
1-ethyl-2-phenyl-3-benzoylindole,
1-benzyl-2-methyl-3-benzoylindole,
1,4,7-trimethyl-2-phenyl-3-benzoylindole,
1-n-butyl-2-phenyl-3-benzoylindole,
1-cyanoethyl-2-methyl-3-benzoylindole,
1-cyanoethyl-2-phenyl-3-benzoylindole,
1-methyl-2-(2'-chlorophenyl)-3-benzoylindole, 1-methyl-2-phenyl-3-(2'-chlorobenzoyl)-indole,
1-methyl-2-phenyl-3-(3'-chlorobenzoyl)-indole,
1-methyl-2-phenyl-3-(4'-methylbenzoyl)-indole,
1,2-dimethyl-3-(2'-chlorobenzoyl)-indole,
1,2-dimethyl-3-(3'-chlorobenzoyl)-indole,
1,2-dimethyl-3-(4'-methylbenzoyl)-indole and
1-ethyl-2-phenyl-3-(2'-chlorobenzoyl)-indole.

Suitable aromatic amines of the general Formula VII are, for example:

N,N-dimethylaniline,
N,N-diethylaniline,
N,N-dibutylaniline,
N-methyl-N-hydroxy-ethylaniline,
N,N-dihydroxyethylaniline,
N-methyl-N-chloroethylaniline,
N,N-dichloroethylaniline,
1-N-ethyl-N-hydroxy-ethyl-amino-3-methylbenzene,
1-N-ethyl-N-chloroethylamino-3-methylbenzene,
N-butyl-N-hydroxyethylaniline,
3-chloro-1-N,N-diethylaniline,
3-chloro-1-N,N-dimethylaniline,
N-methyl-N-benzylaniline,
N-ethyl-N-benzylaniline,
1-N-ethyl-N-benzylamino-3-methylbenzene,
N-methyldiphenylamine,
N-ethyldiphenylamine,
N-cyanoethyldiphenylamine,
N-(4-ethoxyphenyl)-N-methylaniline,
3-methoxy-1-N,N-dimethylaniline and
3-ethoxy-1-N,N-diethylaniline.

Acidic condensing agents suitable for the present process are, in particular, phosphorus oxychloride, thionyl chloride, phosgene, zinc chloride, aluminium chloride, etc.

Another suitable process for the preparation of the new dyestuffs consists in condensing benzanilides of the general formula

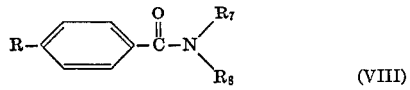

(VIII)

in which R has the same meaning as above, while $R_7$ stands for hydrogen or the alkyl radical, and $R_8$ stands for an aromatic radical, with aromatic amines of the general Formula VII in the presence of acidic condensing agents and subsequently with indoles of the general Formula V without isolating the intermediate products.

The following benzanilides (VIII) which are suitable for the present process may be mentioned by way of example: benzanilide, 2-chlorobenzanilide, 3-chlorobenzanilide, 2-methylbenzanilide, 3-methylbenzanilide, 4-methylbenzanilide, 2-methoxybenzanilide, 2-ethoxybenzanilide, 2,4-dimethylbenzanilide, 2,5-dichlorobenzanilide and 2,6-dichlorobenzanilide.

The same compounds indicated for the second method of procedure are also suitable as aromatic amines (VII) for this method of production. Those indole compounds which have been mentioned as suitable for the first method of production may also be used. Phosphorus oxychloride, thionylchloride, phosgene, zinc chloride, aluminium chloride, etc. are suitable as acidic condensing agents also in this case.

The products obtainable according to the present process are extraordinarily valuable dyestuffs which can be used for the dyeing and printing of materials of leather, tannin-treated cotton, cellulose acetate, synthetic superpolyamides and superurethanes, as well as for the dyeing of lignin-containing fibres, such as coconut fibres, jute and sisal. They are also suitable for the production of liquid writing inks, stamping inks, ball point pastes, and they may also be used in offset printing. Above all, they are eminently suitable for the dyeing and printing of materials which are composed partially or completely of polymerised acrylonitrile and/or vinylidene cyanide, or which are composed partially or completely of acid-modified aromatic polyesters, such as sulphonic acid group-containing polyethylene terephthalate, and are here distinguished by very good fastness to light, wet processing, rubbing and sublimation. Furthermore, they possess a very good affinity for these fibres and have a good fastness to cross-dyeing. With anionic precipitants, such as aluminum oxide, tannin, phosphotungstic (molybdic) acids, the dyestuffs form pigments which are fast to light and can advantageously be used for printing paper.

The present invention further relates to the dyeing and printing of polymers and copolymers of acrylonitrile or asymmetric dicyanoethylene, or of acid-modified aromatic polyesters. In accordance with the invention it has been found that shaped articles, such as fibres, foils, fabrics and the like, obtained from polymers or copolymers of acrylonitrile or asymmetric dicyanoethylene, or from acid-modified aromatic polyesters can be dyed and printed in very fast shades by using as dyestuffs compounds which are free from sulphonic acid and carboxylic acid groups and correspond to the general formula

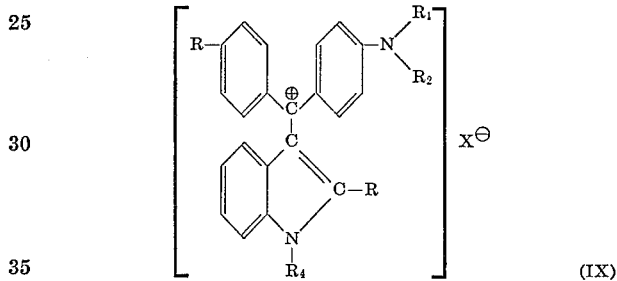

(IX)

in the above formula $R_3$ represents hydrogen, an alkyl or aryl group, a carboxylic acid ester group, an optionally N-substituted carbonamide group, or an alkoxy group; $R_4$ means hydrogen or an alkyl, aralkyl, cycloalkyl or aryl radical; $R_1$ means hydrogen, an alkyl, aralkyl, cycloalkyl or aryl radical; $R_2$ means hydrogen, an alkyl, cycloalkyl or an aralkyl radical; R means hydrogen, halogen, such as Cl and Br, alkoxy, aralkoxy, aryloxy, acyloxy, alkyl, aralkyl, aryl, nitro, cyano, trifluoromethyl and carboxylic acid ester groups, optionally N-substituted carbonamide groups, acyl groups and alkylsulphonyl or arylsulphonyl groups, and X is an anion; the aromatic and (cyclo) aliphatic radicals, including the benzene rings according to the above formula, may carry further substituents (non-ionic substituents), with the exception of sulphonic acid and carboxylic acid groups.

Suitable aryl radicals R, $R_1$, $R_2$ and $R_4$ are preferably those of the benzene series, such as phenyl, 4-methylphenyl-4-chlorophenyl, 4-methoxyphenyl, 2-methoxyphenyl or 2-chlorophenyl. Suitable carboxylic acid ester groups are, for example, the carboxylic acid methyl or ethyl ester; suitable carbonamide groups are, for example, the carboxylic acid methylamide and dimethylamide group.

Suitable alkyl radicals R, $R_1$, $R_2$, $R_3$ and $R_4$ are, in particular, lower alkyl radicals containing 1–5 carbon atoms, such as methyl, ethyl and butyl radicals which may also contain non-ionic substituents. Suitable non-ionic substituents are, for example, lower alkyl and alkoxy radicals containing 1–4 carbon atoms; aralkyl, such as benzyl; aralkoxy, such as benzyloxy; aryl, such as phenyl, and phenyl radicals substituted by non-ionic radicals, e.g. chlorophenyl, methylphenyl, ethylphenyl, nitrophenyl, cyanophenyl etc.; aryloxy groups, such as phenyloxy; halogen substituents, especially Cl and Br; carboxylic acid ester groups, especially carboxylic acid methyl ester and ethyl ester groups, optionally N-substituted carbonamide groups, lower alkyl groups being preferred as N-substituents which may be further substituted, e.g. by Cl, Br and OH; the cyano, nitro, hydroxyl or amino group; alkylsulphonyl, such as methylsulphonyl and ethylsulphonyl; arylsulphonyl, such as benzene-sulphonyl and p-toluene-sulphonyl; acyloxy groups, such as acetoxy and propionyloxy; acylamino groups, such as acetylamino, propionylamino, ethylsulphonylamino, methylsulphonylamino, benzoylamino, benzene-sulphonylamino etc.; and acyl radicals, such as the benzoyl and the acetyl radical.

More particularly the invention concerns the dyeing and printing of polymers or copolymers of acrylonitrile or asymmetric dicyanoethylene, or of acid-modified aromatic polyesters which comprises applying a dyestuff being free of sulphonic acid and carboxylic acid groups of the formula

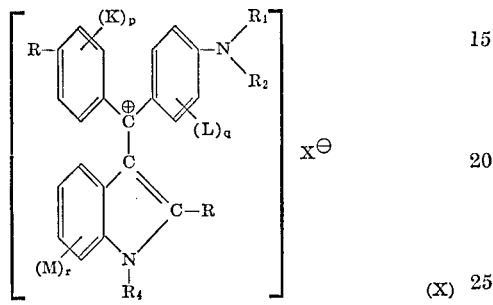

(X)

wherein $R_3$ stands for hydrogen, alkyl, aryl, carboxylic acid ester group, carbonamide or substituted carbonamide group or alkoxy, $R_4$ stands for hydrogen or an alkyl, aralkyl, cycloalkyl or aryl radical, $R_1$ stands for hydrogen, an alkyl, aralkyl, cycloalkyl or aryl radical, $R_2$ stands for hydrogen, an alkyl, cycloalkyl or aralkyl radical, R stands for hydrogen, halogen, an alkoxy, aralkoxy, aryloxy, acyloxy, alkyl, aralkyl, aryl, nitro, cyano, trifluoromethyl radical or a carboxylic acid ester radical, carbonamide or substituted carbonamide, acyl, alkyl sulphonyl or arylsulphonyl groups, X stands for an anion, K, L and M stand independently for hydrogen or a substituent, $p$, $q$ and $r$ stand independently for an integer ranging from 1 to 2.

The invention also concerns polyacrylonitrile containing at least 50 percent of acrylonitrile, or acid-modified aromatic polyesters dyed with a sulphonic acid group-free and carboxylic acid group-free compound of the Formulae II, III, X or XI.

A further group of preferred dyestuffs to be applied corresponds to the formula

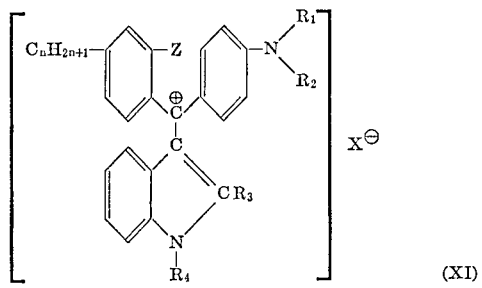

(XI)

in which $R_3$ stands for a lower alkyl radical, preferably methyl or ethyl, or for a phenyl radical which may be substituted by chlorine, bromine, lower alkyl or lower alkoxy radicals; $R_4$ stands for hydrogen, a lower alkyl radical, such as —CH$_3$, —C$_2$H$_5$, n—C$_3$H$_7$, n—C$_4$H$_9$, or benzyl, $R_1$ stands for hydrogen or for a lower alkyl radical, such as methyl or ethyl, or for the benzyl radical, or for a phenyl radical which may be substituted by chlorine, bromine, lower alkyl or lower alkoxy; $R_2$ stands for hydrogen, a lower alkyl radical, such as methyl or ethyl, or benzyl; $n$ is the number 0, 1, 2 or 3; Z stands for a halogen substituent, especially Cl or Br, for a lower alkyl substituent, such as methyl, ethyl or propyl, or for a lower alkoxy substituent, such as methoxy or ethoxy; X represents an anionic radical.

The dyestuffs of the above general Formulae IX, X and XI are obtained, for example, by condensing in the 3-position 4-aminobenzo-phenones of the general formula

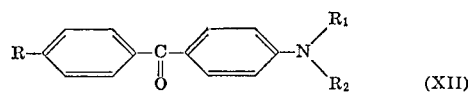

(XII)

in the presence of acidic condensing agents with indole derivatives of the general formula

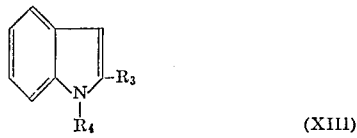

(XIII)

The dyestuffs can also be prepared by reacting compounds of the general formula

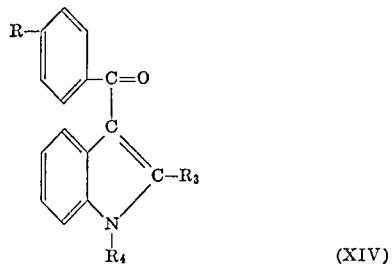

(XIV)

with aromatic amines of the general formula

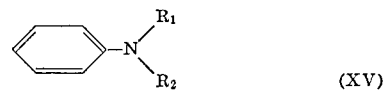

(XV)

in the presence of acidic condensing agents.

Another process for the production of the dyestuffs to be used according to the invention consists in condensing compounds of the general formula

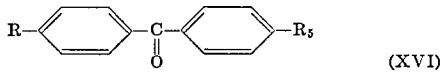

(XVI)

in which $R_5$ stands for a halogen atom, the oxy group, for an alkoxy, acyloxy or amino group, with indole derivatives of the Formula XIII in the presence of acidic condensing agents, and by reacting the resultant intermediate products of the general formula

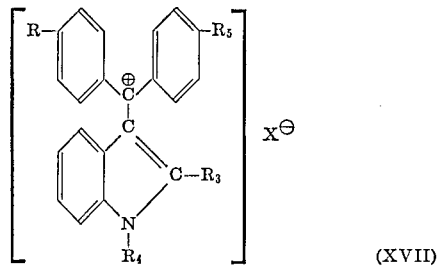

(XVII)

with primary aromatic amines with the exchange of the radical $R_5$ for an amino group. In the preceding Formulae XII to XVII, the radicals R, $R_1$, $R_2$, $R_3$, $R_4$ and X have the same meaning as given above.

The anionic radicals X$^-$ can be inorganic as well as organic ions; the following may be mentioned by way of example: Cl$^-$, Br$^-$, I$^-$, CH$_3$SO$_4^-$, C$_2$H$_5$SO$_4^-$, p-toluene sulphonate-, HSO$_4^-$, benzene sulphonate-, p-chlorobenzene sulphonate-, phosphate-, acetate-, formate-, propionate-, butyrate-, oxalate-, lactate-, maleinate-, succinate-, crotonate-, tartrate-, [BF$_4$]$^-$, citrate-, NO$_3^-$, perchlorate-, ZnCl$_3^-$ etc. The type of the anionic radicals is immaterial for the use of the dyestuffs, provided they are largely colourless radicals which do not impair the solubility of the dyestuffs in an undesirable way.

For the dyeing with the basic dyestuffs of the above general formula, there are especially suitable: flocks, fibres, filaments, ribbons, woven and knitted fabrics of polyacrylonitrile or of copolymers of polyacrylonitrile with other vinyl compounds, such a vinyl chloride, vinyl- Examples of suitable dyestuffs of the general Formula IX are set out in the following table:

$$\left[ \begin{array}{c} A \diagdown \overset{\oplus}{C} \diagup B \\ | \\ D \end{array} \right] X^{\ominus}$$

| A | B | D |
|---|---|---|
| Phenyl- | 4-N-phenyl-N-methylaminophenyl- | 1-methyl-2-phenyl-5-chloroindolyl-3- |
| Phenyl- | 4-N-phenyl-N-methylaminophenyl- | 1-ethyl-2-methylindolyl-3- |
| Phenyl- | 4-N-phenyl-N-methylaminophenyl- | 1-ethyl-2-phenylindolyl-3- |
| Phenyl- | 4-N-phenyl-N-methylaminophenyl- | 1-ethyl-2,5-dimethylindolyl-3- |
| Phenyl- | 4-N-phenyl-N-methylaminophenyl- | 1-ethyl-2-phenyl-5-methylindolyl-3- |
| Phenyl- | 4-N-phenyl-N-methylaminophenyl- | 1-ethyl-2-methyl-5-chloroindolyl-3- |
| Phenyl- | 4-N-phenyl-N-methylaminophenyl- | 1-ethyl-2-phenyl-5-chloroindolyl-3- |
| Phenyl- | 4-N-phenyl-methylaminophenyl- | 1-benzyl-2-methylindolyl-3- |
| Phenyl- | 4-N-phenyl-N-methylaminophenyl- | 1,4,7-trimethyl-2-phenylindolyl-3- |
| Phenyl- | 4-N-phenyl-N-methylaminophenyl- | 1-n-butyl-2-phenylindolyl-3- |
| Phenyl- | 4-N-phenyl-N-methylaminophenyl- | 1-isobutyl-2-(4'-chlorophenyl)-4,6-dimethylindolyl-3- |
| Phenyl- | 4-N-phenyl-N-methylaminophenyl- | 1-cyanoethyl-2-methylindolyl-3- |
| Phenyl- | 4-N-phenyl-N-methylaminophenyl- | 1-cyanoethyl-2-phenylindolyl-3- |
| Phenyl- | 4-N-phenyl-N-methylaminophenyl- | 1-methyl-2-phenyl-5-methoxyindolyl-3- |
| Phenyl- | 4-N-phenyl-N-methylaminophenyl- | 1-methyl-2-phenyl-5-ethoxyindolyl-3- |
| Phenyl- | 4-N-phenyl-N-methylamino-phenyl- | 1-methyl-2-phenylindolyl-3- |
| Phenyl- | 4-N-(4'-ethoxyphenyl)-N-methylaminophenyl- | 1-methyl-2-phenylindolyl-3- |
| Phenyl- | 4-N-phenyl-N-methylaminophenyl- | 1,2-dimethylindolyl-3- |
| Phenyl- | 4-N-(4'-ethoxyphenyl)-N-methylaminophenyl- | 1,2-dimethylindolyl-3- |
| Phenyl- | 4-N,N-dimethylaminophenyl- | 1-methyl-2-phenylindolyl-3- |
| Phenyl- | 4-N,N-diethylaminophenyl- | 1-methyl-2-phenylindolyl-3- |
| 2-chlorophenyl- | 4-N-phenyl-N-methylaminophenyl- | 1-methyl-2-phenylindolyl-3- |
| 2-chlorophenyl- | 4-N-phenyl-N-methylaminophenyl- | 1,2-dimethylindolyl-3- |
| 2-chlorophenyl- | 4-N-(4'-ethoxyphenyl)-N-methylaminophenyl- | 1-methyl-2-phenylindolyl-3- |
| 2-chlorophenyl- | 4-N-(4'-ethoxyphenyl)-N-methylaminophenyl- | 1,2-dimethylindolyl-3- |
| 2-chlorophenyl- | 4-N,N-dimethylaminophenyl- | 1-methyl-2-phenylindolyl-3- |
| 2-chlorophenyl- | 4-N,N-diethylaminophenyl- | 1-methyl-2-phenylindolyl-3- |
| 2-chlorophenyl- | 4,N,N-dimethylaminophenyl- | 1,2-dimethylindolyl-3- |
| 2-chlorophenyl- | 4-N,N-diethylaminophenyl- | 1,2-dimethylindolyl-3- |
| 3-chlorophenyl- | 4-N,N-diethylaminophenyl- | 1-methyl-2-phenylindolyl-3- |
| 3-chlorophenyl- | 4-N,N-diethylaminophenyl- | 1,2-dimethylindolyl-3- |
| 4-chlorophenyl- | 4-N,N-dimethylaminophenyl- | 1-methyl-2-phenylindolyl-3- |
| 4-methylphenyl- | 4-N,N-diethylaminophenyl- | 1-methyl-2-phenylindolyl-3- |
| 4-methoxyphenyl | 4-N-phenyl-N-methylaminophenyl- | 1-methyl-2-phenylindolyl-3- |
| Phenyl- | 4-aminophenyl- | 1-methyl-2-phenylindolyl-3- |
| Phenyl- | 4-aminophenyl- | 1,2-dimethylindolyl-3- |
| Phenyl- | 4-aminophenyl- | 2-methylindolyl-3- |
| Phenyl- | 4-N-phenyl-N-methylaminophenyl- | 2-phenylindolyl-3- |
| Phenyl- | 4-phenylaminophenyl- | 1-methyl-2-phenylindolyl-3- |
| Phenyl- | 4-N-(4'-methylphenyl)-aminophenyl- | 1-methyl-2-phenylindolyl-3- |
| Phenyl- | 4-N-(3'-methylphenyl)-aminophenyl- | 1-methyl-2-phenylindolyl-3- |
| Phenyl- | 4-N-(2'-methylphenyl)-aminophenyl- | 1-methyl-2-phenylindolyl-3- |
| Phenyl- | 4-N-(4'-chlorophenyl)-aminophenyl- | 1-methyl-2-phenylindolyl-3- |
| Phenyl- | 4.N.(4'acetylaminophenyl)-aminophenyl- | 1-methyl-2-phenylindolyl-3- |
| Phenyl- | 4-N-(4'-methylsulfonyl-phenyl)-aminophenyl- | 1-methyl-2-phenylindolyl-3- |
| Phenyl- | 4-N-(2',6'-dimethylphenyl)-aminophenyl- | 1-methyl-2-phenylindolyl-3- |
| Phenyl- | 4-N-phenyl-N-methylaminophenyl- | 2,5-dimethylindolyl-3- |
| Phenyl- | 4-N-phenyl-N-methylaminophenyl- | 2-methyl-5-chloroindolyl-3- |
| Phenyl- | 4-N-phenyl-N-methylaminophenyl- | 2-phenyl-5-methylindolyl-3- |
| Phenyl- | 4-N-phenyl-N-methylaminophenyl- | 1,2,5-trimethylindolyl-3- |
| Phenyl- | 4-N-phenyl-N-methylaminophenyl- | 1,5-dimethyl-2-phenylindolyl-3- |
| Phenyl- | 4-N-phenyl-N-methylaminophenyl- | 1,2-dimethyl-5-chloroindolyl-3- | idene chloride, vinyl fluoride, vinyl acetate, vinyl pyridine, vinyl imidazole, vinyl alcohol, acrylic and methacrylic acid esters and amides, and asymmetric dicyanoethylene, particularly those polymers or copolymers containing at least 50 percent acrylonitrile. The dyestuffs can likewise be applied for the dyeing and printing of acid-modified aromatic polyesters in form of their flocks, fibres, foils, filaments, ribbons, woven and knitted fabrics. Examples of acid-modified aromatic polyesters are e.g. polycondensation products of sulphoterephthalic acid and ethylene glycol (type Dacron® X 64 of E. I. du Pont de Nemours and Company), such as described in Belgian patent specification 549,179 and U.S. Patent specification 2,893,816.

Dyeing can be effected from a weakly acidic bath; it is expedient to introduce the material into the dyebath at 40–60° C. and to dye at boiling temperature. It is also possible to dye under pressure at temperatures above 100° C. Furthermore, the dyestuffs may be added to spinning solutions for the production of polyacrylonitrile-containing fibres or to apply them on the not-orientated fibre.

The dyeings obtainable according to the invention are characterised by bright, predominantly red, violet, blue and green shades of very good fastness to light and washing. The good affinity of the dyestuffs and their good fastness to cross-dyeing in an acetic acid or sulphuric acid medium should also be emphasized.

Dyestuffs which are not substituted in the phenyl radical A in the p-position, or contain as non-ionic substituent R halogen, a lower alkyl or alkoxy group and/or in the o-position of the radical A a halogen atom, such as Cl or Br, a lower alkyl or alkoxy group, have a preferred interest from the technical point of view; in particular, the derivatives which are substituted in the o-position to the central carbon atom are distinguished by especially clear shades.

EXAMPLE 1

37.8 parts by weight N-phenyl-N-methylaminobenzophenone, 27.2 parts by weight 1-methyl-2-phenyl-indole and 35 parts by weight phosphorus oxychloride are heated together to 100° C. and the mixture is kept at this temperature for 3 hours. The hot melt is added to 600 parts by volume of water at 50° C., and the pH value is adjusted to 2 by the addition of 140 parts by volume of a 20% sodium acetate solution. Precipitation of the dyestuff is then completed by the addition of 30 parts by weight of sodium chloride and the mixture is stirred for some hours. The resultant dye resin is separated, dissolved in 4000 parts by volume of boiling water, the solution is clarified with active charcoal and, when the solution is somewhat cooler, the dyestuff is precipitated by the addition of 90 parts by volume of a solution of zinc chloride in an equal amount by weight of water. The dyestuff is stirred for some time, filtered off with suction and washed with a 10% sodium chloride solution. The dyestuff thus obtained corresponds to the formula

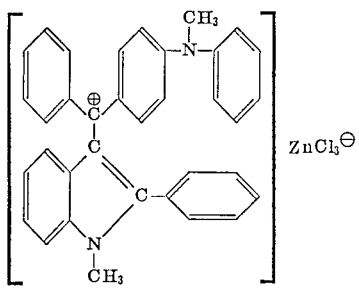

and dyes fibres of polyacrylonitrile in a bluish green shade which is fast to light.

Valuable dyestuffs are also obtained when in the preceding example there are used, instead of 1-methyl-2-phenylindole, the equivalent amounts of the indole derivatives set out in the following table.

| Indole derivative: | Shade on polyacrylonitrile fibres |
|---|---|
| 2-phenylindole | Bluish green. |
| 2-methylindole | Greenish blue. |
| 1,2-dimethylindole | Do. |
| 1-methyl-2-phenyl-5-methoxyindole | Blue-green. |
| 1-ethyl-2-phenylindole | Bluish green. |
| 1-ethyl-2-methylindole | Blue. |
| 1-ethyl-2-phenyl-5-methyl-indole | Green-blue. |
| 1,5-dimethyl-2-phenylindole | Bluish green. |
| 1-cyanoethyl-2-phenylindole | Do. |
| 1-cyanoethyl-2-methylindole | Bluish green. |
| 1-ethyl-2-phenyl-7-chloroindole | Do. |
| 1,6-dimethyl-2-phenylindole | Do. |
| 1-isobutyl-2-phenylindole | Do. |
| 1-ethyl-2-phenyl-6-methylindole | Do. |
| 1-n-butyl-2-phenyl-6-methylindole | Do. |
| 1-n-butyl-2-phenylindole | Do. |

EXAMPLE 2

45 parts of weight 4-N,N-dimethylaminobenzophenone, 41.4 parts by weight 1-methyl-2-phenylindole and 50 parts by weight phosphorus oxychloride are mixed and the mixture is heated at 100° C. for 3 hours. The hot melt is poured into 1000 parts by volume of water at 50° C. and the reaction mixture is adjusted to a pH value of 2 with 320 parts by volume of a 20% sodium acetate solution. After the solution has cooled, the dyestuff is precipitated by the addition of 100 parts by weight of sodium chloride and 150 parts by volume of a solution of zinc chloride in an equal amount by weight of water. For further purification, the dyestuff is dissolved in boiling water, clarified with active charcoal and precipitated by the addition of 30 parts by volume of a zinc chloride solution. The dyestuff thus obtained dyes fibers of polyacrylonitrile in a greenish blue shade which is fast to light.

When the reaction is carried out according to the processes described above with the aminobenzophenones and indole derivatives set out in the following table, dyestuffs are also obtained which are distinguished by very good tinctorial properties.

| Aminobenzophenone | Indole | Shade on polyacrylonitril |
|---|---|---|
| 4-dimethylaminobenzophenone | 1,2-dimethylindole | Bluish violet. |
| Do | 2-methyl-1-ethyl-6,7-benzoindole | Blue-grey. |
| 4-diethylaminobenzophenone | 1-methyl-2-phenylindole | Blue. |
| Do | 2-methylindole | Violet. |
| Do | 2-phenylindole | Green-blue. |
| Do | 2-methyl-1-ethyl-6,7-benzoindole | Grey-violet. |
| 4-dimethylamino-4'-methylbenzophenone | 1,2-dimethylindole | Reddish violet. |
| Do | 1-methyl-2-phenylindole | Greenish blue. |
| 4-dimethylamino-3'-chlorobenzophenone | 1,2-dimethylindole | Reddish blue. |
| Do | 1-methyl-2-phenylindole | Blue. |
| 4-dimethylamino-2'-chlorobenzophenone | 1,2-dimethylindole | Reddish blue. |
| Do | 1-methyl-2-phenylindole | Blue. |
| 4-diethylaminobenzophenone | 1,2-dimethylindole | Blue-violet. |
| 4-diethylamino-4'-methylbenzophenone | do | Bluish violet. |
| Do | 1-methyl-2-phenylindole | Blue-green. |
| 4-diethylamino-3'-chlorobenzophenone | 1,2-dimethylindole | Blue. |
| Do | 1-methyl-2-phenylindole | Strongly greenish blue. |
| 4-dimethylamino-3'-methylbenzophenone | 1,2-dimethylindole | Reddish violet. |
| Do | 1-methyl-2-phenylindole | Reddish blue. |
| 4-N-phenyl-N-methylamino-2'-chlorobenzophenone | 1,2-dimethylindole | Greenish blue. |
| Do | 1-methyl-2-phenylindole | Turquoise. |
| 4-N-(4'-ethoxyphenyl)-N-methylaminobenzophenone | 1,2-dimethylindole | Greenish blue. |
| Do | 1-methyl-2-phenylindole | Bluish green. |
| Do | 2-methylindole | Blue. |
| 4-diethylamino-4'-phenylbenzophenone | 1-methyl-2-phenylindole | Green. |
| Do | 1,2-dimethylindole | Blue-grey. |
| 4-dimethylamino-4'-methylbenzophenone | 2-methylindole | Bluish bordeaux. |
| Do | 2-phenylindole | Blue-green. |
| 4-dimethylamino-3'-chlorobenzophenone | 2-methylindole | Reddish blue. |
| Do | 2-phenylindole | Greenish blue. |
| 4-dimethylamino-2'-chloro-benzophenone | 2-methylindole | Bluish violet. |
| Do | 2-phenylindole | Greenish blue. |
| 4-diethylamino-4'-methylbenzophenone | 2-methylindole | Violet. |
| 4-dimethylamino-2',5'-dichloro-benzophenone | 1,2-dimethylindole | Blue. |
| Do | 1-methyl-2-phenylindole | Greenish blue. |
| Do | 2-methylindole | Reddish blue. |
| Do | 2-phenylindole | Greenish blue. |
| 4-dimethylamino-3'-methyl-4'-nitrobenzophenone | 1,2-dimethylindole | Do. |
| Do | 1-methyl-2-phenylindole | Blue-green. |
| 4-diethylamino-2'-chloro-benzophenone | 1,2-dimethylindole | Blue. |
| Do | 1-methyl-2-phenylindole | Greenish blue. |
| 4-cyanoethyl-methylaminobenzophenone | 1,2-dimethylindole | Violet. |
| Do | 1-methyl-2-phenylindole | Greenish blue. |
| 4-diethylamino-3'-methylbenzophenone | 1,2-dimethylindole | Reddish blue. |
| Do | 1-methyl-2-phenylindole | Greenish blue. |
| 4-(p-ethoxyphenyl)-methyl-amino-4'-methylbenzophenone | 1,2-dimethylindole | Do. |
| Do | 1-methyl-2-phenylindole | Bluish green. |
| 4-(p-ethoxyphenyl)-methylamino-3-chlorobenzophenone | 1,2-dimethylindole | Greenish blue. |
| 4-(p-ethoxyphenyl)-methylamino-3'-chloro-benzophenone | 1-methyl-2-phenylaindole | Bluish green. |
| 4-diethylamino-2'-chloro-benzophenone | 2-methylindole | Reddish blue. |
| Do | 2-phenylindole | Greenish blue. |
| 4-cyanoethyl-methylaminobenzophenone | do | Blue-green. |
| Do | 2-methylindole | Reddish violet. |
| 4-phenylmethylamino-3'-nitro-4'-methylbenzophenone | 1,2-dimethylindole | Greenish blue. |
| Do | 1-methyl-2-phenylindole | Bluish green. |
| 4-phenylmethylamino-3'-chlorobenzophenone | do | Do. |
| Do | 1,2-dimethylindole | Greenish blue. |
| 4-phenylmethylamino-4'-methyl-benzophenone | do | Do. |
| Do | 1-methyl-2-phenylindole | Bluish green. |

| Aminobenzophenone | Indole | Shade on polyacrylonitrile |
|---|---|---|
| 4-phenylmethylamino-2',5'-dichlorobenzophenone | do | Do. |
| Do | 1,2-dimethylindole | Greenish blue. |
| 4-phenylmethylamino-3'-methylbenzophenone | 1-methyl-2-phenylindole | Bluish green. |
| Do | 1,2-dimethylindole | Greenish blue. |
| 4-diethylamino-3'-chloro-benzophenone | 2-phenylindole | Blue-green. |
| Do | 2-methylindole | Reddish blue. |
| 4-diethylamino-3'-methylbenzophenone | 2-phenylindole | Blue-green. |
| Do | 2-methylindole | Bluish violet. |
| 4-phenylmethylamino-4'-methylbenzophenone | 2-phenylindole | Bluish green. |
| Do | 2-methylindole | Blue-gray. |
| 4-dimethylamino-3'-nitro-4'-methylbenzophenone | do | Reddish dark blue. |
| Do | 2-phenylindole | Blue-green. |
| 4-phenylmethylamino-2',5'-dichlorobenzophenone | 2-methylindole | Greenish blue. |
| Do | 2-phenylindole | Bluish green. |
| 4-dimethylamino-3'-methyl-4'-nitrobenzophenone | 1,2-dimethylindole | Greenish blue. |
| Do | 1-methyl-2-phenylindole | Blue-green. |
| 4-dimethylamino-3'-nitro-benzophenone | do | Greenish blue. |
| Do | 1,2-dimethylindole | Blue. |
| 4-dimethylamino-3'-methyl-4'-nitrobenzophenone | 2-phenylindole | Bluish green. |
| Do | 2-methylindole | Greenish blue. |
| 4-dimethylamino-3'-nitrobenzophenone | do | Reddish blue. |
| Do | 2-phenylindole | Greenish blue. |
| 4-diethylamino-3'-methyl-4'-nitrobenzophenone | 1,2-dimethylindole | Do. |
| Do | 1-methyl-2-phenylindole | Blue-green. |
| 4-diethylamino-3'-nitro-benzophenone | do | Greenish blue. |
| Do | 1,2-dimethylindole | Blue. |
| 4-diethylamino-2',5'-dichloro-benzophenone | do | Do. |
| Do | 1-methyl-2-phenylindole | Greenish blue. |
| 4-diemthylamino-2'-chloro-benzophenone | 1-ethyl-2-methylindole | Reddish blue. |
| 4-dimethylamino-2',5'-dichloro-benzophenone | do | Blue. |
| 4-phenylmethylamino-2',5'-dichloro-benzophenone | do | Greenish blue. |
| 4-diethylamino-2'-chloro-benzophenone | do | Blue. |
| 4-phenylmethylamino-2'-chloro-benzophenone | do | Greenish blue. |
| 4-diethylaminobenzophenone | do | Reddish blue. |
| 4-dimethylamino-3'-chloro-benzophenone | do | Do. |
| 4-phenylmethylamino-4'-methylbenzophenone | do | Greenish blue. |
| 4-di-n-propylaminobenzophenone | 1,2-dimethyl-indole | Reddish blue. |
| Do | 1-methyl-2-phenylindole | Greenish blue. |
| 4-dimethylamino-2'-chloro-benzophenone | 1-ethyl-2-phenylindole | Do. |
| 4-dimethylamino-2',5'-dichlorobenzophenone | do | Do. |
| 4-diethylamino-2'-chlorobenzophenone | do | Do. |
| 4-phenylmethylamino-2'-chlorobenzophenone | do | Green-blue. |
| 4-diethylaminobenzophenone | 1,5-dimethyl-2-phenylindole | Blue-green. |
| 4-dimethylamino-2'-chlorobenzophenone | do | Greenish blue. |
| 4-dimethylamino-2',5'-dichlorobenzophenone | do | Do. |
| 4-diethylamino-2'-chlorobenzophenone | do | Do. |
| 4-phenylmethylamino-2'-chlorobenzophenone | do | Bluish green. |
| 4-dimethylamino-2'-chlorobenzophenone | 1-ethyl-2-phenyl-5-methylindole | Greenish blue. |
| 4-diethylamino-2'-chlorobenzophenone | do | Do. |
| 4-dimethylamino-2',5'-dichlorobenzophenone | do | Do. |
| 4-p-ethoxyphenylmethylaminobenzophenone | 1-ethyl-2-methylindole | Green-blue. |
| Do | 1-ethyl-2-phenylindole | Bluish green. |
| 4-diethylaminobenzophenone | 1-cyanoethyl-2-phenylindole | Dark blue. |
| 4-dimethylamino-2'-chlorobenzophenone | do | Greenish blue. |
| 4-diethylaminobenzophenone | 1-cyanoethyl-2-methylindole | Reddish dark blue. |
| 4-di-n-propylamino-2',5'-dichlorobenzophenone | 1,2-dimethylindole | Greenish blue. |
| Do | 1-methyl-2-phenylindole | Greenish blue. |
| 4-di-n-propylamino-2'-chlorobenzophenone | do | Blue. |
| Do | 1,2-dimethylindole | Do. |
| 4-diethylaminobenzophenone | 1-ethyl-2-phenyl-7-chloroindole | Blue-grey. |
| 4-N-phenylmethylamino-2'-chlorobenzophenone | 1-cyanoethyl-2-phenylindole | Blue-green. |
| 4-(N-p-ethoxyphenyl-N-methyl)-aminobenzophenone | do | Do. |
| 4-phenylmethylamino-2'-chlorobenzophenone | 1-cyanoethyl-2-methylindole | Greenish blue. |
| 4-(N-p-ethoxyphenyl-N-methyl)-aminobenzophenone | do | Blue-green. |
| 4-(p-methylphenylmethyl)-aminobenzophenone | 1-methyl-2-phenylindole | Bluish green. |
| Do | 1,2-dimethylindole | Greenish blue. |
| 4-N-(p-ethoxyphenylmethylamino)-2'-chlorobenzophenone | do | Do. |
| Do | 1-methyl-2-phenylindole | Bluish green. |
| 4-diethylamino benzophenone | 1,6-dimethyl-2-phenylindole | Blue green. |
| 4-diethylamino-2'-chlorobenzophenone | do | Greenish blue. |
| 4-diethylaminobenzophenone | 1-isobutyl-2-phenylindole | Do. |
| 4-diethylamino-2'-chlorobenzophenone | do | Do. |
| 4-phenylmethylamino-2'-chlorobenzophenone | 2-phenylindole | Olive. |
| Do | 2-methylindole | Greenish blue. |
| Do | 1-isobutyl-2-phenylindole | Bluish green. |
| Do | 1,7-dimethyl-2-phenylindole | Do. |
| 4-diethylaminobenzophenone | 1-ethyl-2-phenyl-6-methylindole | Blue green. |
| 4-diethylamino-2'-chlorobeznophenone | do | Greenish blue. |
| 4-phenylmethylamino-2'-chlorobenzophenone | do | Bluish green. |
| 4-diethylaminobenzophenone | 1-n-butyl-2-phenyl-6-methylindole | Blue-green. |
| 4-diethylamino-2'-chlorobenzophenone | do | Greenish blue. |
| 4-phenylmethylamino-2'-chlorobenzophenone | do | Bluish green. |
| 4-diethylaminobenzophenone | 1-benzyl-2-phenyl-7-methylindole | Do. |
| Do | 1-benzyl-2-phenylindole | Grey-green. |
| 4-N-(cyanoethylmethyl)-amino-2'-chlorobenzophenone | | Bluish violet. |
| Do | 1-methyl-2-phenylindole | Greenish blue. |
| 4-diethylaminobenzophenone | 1-n-butyl-2-phenylindole | Do. |
| 4-diethylamino-2'-chlorobenzophenone | do | Do. |
| 4-phenylmethylamino-2'-chlorobenzophenone | do | Blue-green. |
| 4-N-(cyanoethylmethyl)-amino-2'-chlorobenzophenone | 2-phenylindole | Greenish blue. |
| Do | 2-methylindole | Bluish violet. |
| 4-phenylmethylamino-3-bromobenzophenone | 1,2-dimethylindole | Greenish blue. |
| Do | 1-methyl-2-phenylindole | Bluish green. |
| 4-dimethylamino-3-bromobenzophenone | 1,2-dimethylindole | Reddish blue. |
| Do | 1-methyl-2-phenylindole | Greenish blue. |
| 4-diethylamino-3-bromo-2'-chlorobenzophenone | 1,2-dimethylindole | Reddish blue. |
| Do | 1-methyl-2-phenylindole | Greenish blue. |
| 4-diethylamino-3-bromobenzophenone | 1,2-dimethylindole | Bluish violet. |
| Do | 1-methyl-2-phenylindole | Greenish blue. |
| 4-dimethylamino-2-methylbenzophenone | do | Bluish green. |
| Do | 1,2-dimethylindole | Greenish blue. |
| Do | 1-ethyl-2-phenylindole | Bluish green. |
| 4-diethylamino-2'-bromobenzophenone | 1,2-diethylindole | Greenish blue. |
| Do | 1-methyl-2-phenylindole | Do. |
| 4-diethylamino-2'-bromobenzophenone | 1-ethyl-2-phenylindole | Do. |
| 4-phenylmethylamino-2'-bromobenzophenone | 1-methyl-2-phenylindole | Bluish green. |
| Do | 1,2-dimethylindole | Greenish blue. |
| Do | 1-ethyl-2-phenyl-indole | Bluish green. |

| Aminobenzophenone | Indole | Shade on polyacrylonitrile |
|---|---|---|
| 4-amino-2'-chlorobenzophenone | 1,2-dimethylindole | Bluish red. |
| Do | 1-methyl-2-phenylindole | Bluish violet. |
| 4-dimethylamino-2-methyl-2'-bromobenzophenone | 1,2-dimethylindole | Greenish blue. |
| Do | 1-methyl-2-phenylindole | Do. |
| 4-dimethylamino-2-methyl-2'-chlorobenzophenone | 1,2-dimethylindole | Violet-tinted blue. |
| Do | 1-methyl-2-phenylindole | Greenish blue. |
| 4-N-β-chloroethyl-N-methylamino-2-methylbenzophenone | 1,2-dimethylindole | Reddish blue. |
| Do | 1-methyl-2-phenylindole | Bluish green. |
| 4-benzyl-ethylamino-2-methylbenzophenone | do | Do. |
| Do | 1,2-dimethylindole | Greenish blue. |
| 4-diethylamino-2-ethoxybenzophenone | 1-methyl-2-phenylindole | Blue. |
| Do | 1,2-dimethylindole | Reddish blue. |
| 4-N-(4'-ethoxyphenyl)-N-methylamino-2'-chlorobenzophenone | 2-methylindole | Blue. |
| 2-chloro-4'-dibenzylaminobenzophenone | 1-methyl-2-phenylindole | Greenish blue. |
| Do | 1,2-dimethylindole | Reddish blue. |
| Do | 2-phenylindole | Blue-green. |
| 4-methyl-4'-ethylgonzylaminobenzophenone | 1-methyl-2-phenylindole | Bluish green. |
| Do | 1,2-dimethylindole | Bluish bordeaux. |
| 2-chloro-4'-ethylbenzylaminobenzophenone | do | Greenish blue. |
| Do | 1-methyl-2-phenylindole | Do. |
| 4-ethylbenzylaminobenzophenone | do | Blue-green. |
| Do | 1,2-dimethylindole | Reddish blue. |
| 2-chloro-4'-methylbenzylaminobenzophenone | 1-methyl-2-phenylindole | Greenish blue. |
| 2-chloro-4'-ethylbenzylaminobenzophenone | 2-phenylindole | Bluish green. |
| Do | 2-methylindole | Blue-grey. |
| 4-ethylbenzylaminobenzophenone | do | Reddish blue. |
| Do | 2-phenylindole | Blue-green. |
| 4-phenylmethylamino-3'-bromobenzophenone | 1-methyl-2-phenylindole | Greenish blue-grey. |
| Do | 1,2-dimethylindole | Bluish bordeaux. |
| 4-ethylbenzylamino-2-methyl-2'-bromobenzophenone | 1-methyl-2-phenylindole | Greenish blue. |
| Do | 1,2-dimethylindole | Do. |
| 4-amino-2',5'-dichlorobenzophenone | 1-methyl-2-phenylindole | Red-violet. |
| Do | 1,2-dimethylindole | Yellowish red. |
| 4-diethylamino-2-ethoxy-2'-chlorobenzophenone | 1-methyl-2-phenylindole | Greenish blue. |
| Do | 1,2-dimethylindole | Bluish violet. |
| 4-chloroethyl-n-butylaminobenzophenone | do | Reddish blue. |
| Do | 1-methyl-2-phenylindole | Greenish blue. |
| 4-chloroethyl-methylaminobenzophenone | 1,2-dimethylindole | Reddish blue. |
| Do | 1-methyl-2-phenylindole | Greenish blue. |
| 4-di-n-propylaminobenzophenone | 1-n-butyl-2-phenyl-6-methylindole | Blue-green. |
| Do | 1-n-butyl-2-phenylindole | Greenish blue. |
| 4-α-naphthyl-methylamino-benzophenone | 1,2-dimethylindole | Do. |
| Do | 1-methyl-2-phenylindole | Bluish green. |
| 4-α-naphthyl-methylamino-2'-chlorobenzophenone | do | Blue-green. |
| Do | 1,2-dimethylindole | Greenish blue. |
| 4-methylbenzylamino-2'-bromobenzophenone | 1-methyl-2-phenylindole | Do. |
| Do | 1,2-dimethylindole | Blue. |
| 4-diethylamino-2'-methoxybenzophenone | 1-methyl-2-phenylindole | Greenish blue. |
| Do | 1,2-dimethylindole | Do. |
| 4-α-naphthyl-methylamino-2'-bromobenzophenone | 1-methyl-2-phenylindole | Blue-green. |
| Do | 1,2-dimethylindole | Greenish blue. |
| 4-diethylamino-2'-methylbenzophenone | 1-methyl-2-phenylindole | Do. |
| Do | 1,2-dimethylindole | Bluish violet. |
| 4-phenylmethylamino-2'-methoxybenzophenone | 1-methyl-2-phenylindole | Bluish green. |
| Do | 1,2-dimethylindole | Greenish blue. |
| 4-β-chloroethyl-ethylamino-2-methyl-2'-chlorobenzophenone | 1-methyl-2-phenylindole | Bluish green. |
| Do | 1,2-dimethylindole | Greenish blue. |
| 4-phenylmethylamino-2'-methylbenzophenone | 1-methyl-2-phenylindole | Blue-green. |
| Do | 1,2-dimethylindole | Blue. |
| 4-diethylamino-3'-methoxybenzophenone | 1-methyl-2-phenylindole | Greenish blue. |
| Do | 1,2-dimethylindole | Reddish blue. |
| 4-phenylmethyl-amino-3'-ethoxybenzophenone | 1-methyl-2-phenylindole | Green. |
| Do | 1,2-dimethylindole | Greenish blue. |
| 4-ethyl-benzylamino-2'-methylbenzophenone | 1-methyl-2-phenylindole | Do. |
| Do | 1,2-dimethylindole | Reddish blue. |
| 4-ethyl-benzylamino-2'-methoxybenzophenone | 1-methyl-2-phenylindole | Greenish blue. |
| Do | 1,2-dimethylindole | Violet-tinted blue. |
| 4-phenylmethylamino-4'-phenylbenzophenone | 1-methyl-2-phenylindole | Green. |
| Do | 1,2-dimethylindole | Grey. |

EXAMPLE 3

19.7 parts by weight 4-aminobenzophenone and 14.5 parts by weight 1,2-dimethylindole are introduced into 200 parts by weight of alcohol and the reaction mixture is treated at 30° C. with 50 parts by weight of concentrated hydrochloric acid ($d=1.19$). After heating the reaction mixture to 80° C., it is stirred at this temperature for 3 hours. 120 parts by volume of alcohol are subsequently distilled off and the deep-coloured residue is added to a mixture of 250 parts by volume of a saturated sodium chloride solution and 250 parts by weight of ice. The dyestuff suspension is stirred overnight and filtered off with suction; the dyestuff is purified by recrystallisation from water and precipitation with sodium chloride.

Instead of 1,2-dimethylindole, there may also be used with advantage the indoles given below for the preparation of dyestuffs according to the process mentioned above.

| Indole: | Shade of the dyeing on polyacrylonitrile |
|---|---|
| 2-methylindole | Red-violet. |
| 1-methyl-2-phenylindole | Blue-violet. |
| 1-ethyl-2-methylindole | Bluish ruby. |
| 1-ethyl-2-phenylindole | Bluish violet. |
| 1,5-dimethyl-2-phenylindole | Do. |
| 1-ethyl-2-phenyl-5-methylindole | Do. |
| 1-cyanoethyl-2-phenylindole | Reddish violet. |

Instead of 4-aminobenzophenone the nuclearly substituted 4-aminobenzophenones can be reacted with the indoles in the described manner thus yielding the following shades:

| Benzophenones | Indoles | Shade on polyacrylonitrile |
|---|---|---|
| 4-amino-3,5-dibromo-benzophenone | 1,2-dimethylindole | Bluish pink. |
| 4-amino-3-bromo-benzophenone | do | Reddish bordeaux. |
| 4-amino-3,5-dibromo-benzophenone | 1-methyl-2-phenylindole | Reddish violet. |
| Do | 2-methylindole | Bluish pink. |
| 4-amino-2'-chlorobenzophenone | 1,2-dimethylindole | Bluish red. |
| 4-amino-2',5'-dimethylbenzophenone | 1-methyl-2-phenylindole | Reddish violet. |
| Do | 2-methylindole | Bluish ruby. |
| Do | 1,2-dimethylindole | Do. |

EXAMPLE 4

Polyacrylonitrile fibres are introduced at 40° C. into an aqueous bath having a goods-to-liquor ratio 1:40 and containing, per litre, 0.75 g. 30% acetic acid, 0.38 g. sodium acetate and 0.3 g. of the amino-diphenylindoyl-methane dyestuff illustrated by the formula in Example 1. The bath is heated to boiling temperature within 20–30 minutes and kept at this temperature for 30–60 minutes. The polyacrylonitrile fibres are subsequently rinsed and dried. A bluish green dyeing of very good fastness to light is obtained which is also distinguished by a very good fastness to cross-dyeing in an acetic acid and sulphuric acid bath.

EXAMPLE 5

A stamping ink which yields clear, strong prints is prepared from 2 parts by weight of the amino-diphenyl-indolyl-methane dyestuff, the production of which has been described in Example 2, 60 parts by weight glycerol, 20 parts by weight of water and 20 parts by weight of spirit.

EXAMPLE 6

East-Indian bastard skin which has been prepared for dyeing in usual manner is dyed in a milling drum at 40° C. for 45 minutes in a goods-to-liquor ratio 1:10 with 1% of the dyestuff described in Example 1 which was previously pasted with an equal amount of 30% acetic acid. The leather is finished in known manner. A greenish blue dyeing of good fastness properties is obtained.

EXAMPLE 7

19.7 parts by weight benzanilide and 22.7 parts by weight N-methyl-4-ethoxy-diphenylamine are heat at 100° C. for 3 hours with 40 parts by weight phosphorus oxychloride. 20.7 parts by weight 1-methyl-2-phenyl-indole are subsequently introduced and the mixture is heated at 100° C. for a further 3 hours. The hot melt is poured into 1000 parts by volume of water and adjusted to pH 2 with 275 parts by volume of a 20% sodium acetate solution. The reaction mixture is further stirred for several hours, the dye resin is separated and dissolved in 3000 parts by volume of boiling water with the addition of 300 parts by volume of glacial acetic acid and the solution is clarified with active charcoal. The dyestuff is precipitated from the filtrate by the addition of 50 parts by volume of a solution of zinc chloride in an equal amount of water.

The dyestuff dyes materials of polyacrylonitrile in a bluish green shade of very good fastness properties.

EXAMPLE 8

Acid-modified polyglycol terephthalate fibres of the type Dacron® 64 (E. I. du Pont de Nemours and Company) and as, for instance, described in the Belgian patent specification 549,179 and the U.S. patent specification 2,893,816 are introduced at 20° C. into a dye-bath containing per litre 3 g. of sodium sulphate, 0.5 to 2 g. of an oleylpolyglycol ether, prepared with 50 mol of ethyleneoxide, 2.5 to 5 g. of diphenyl and 0.3 g. of the dyestuff of Example 1 and which has been adjusted to a pH of 4.5 to 5.5 with acetic acid. The liquor-to-goods ratio is 40:1. The temperature of the dye-bath is heated within 30 minutes to 98° C. and the bath kept at this temperature for 60 minutes. The dyed fibres are subsequently rinsed with water and dried. A bluish green dyeing of very good fastness properties is obtained.

EXAMPLE 9

Acid-modified polyglycol terephthalate fibres as described in Example 8 are introduced at 20° C. into a dye-bath containing per litre 6 to 10 g. of sodium sulphate, 0.5 to 1 g. of an oleylpolyglycol ether prepared with 50 mol of ethyleneoxide, 0 to 15 g. of dimethylbenzyl-dodecyl-ammoniumchloride and 0.3 g. of the dyestuff of Example 1 and which has been adjusted to a pH of 4 to 5 with acetic acid. The liquor-to-goods ratio is 40:1. The temperature of the dye-bath is heated within 30 minutes to 120° C. and the bath kept at this temperature for 60 minutes. The dyed fibres are subsequently rinsed with water and dried. One obtains a bluish green dyeing of very good fastness properties.

The dyestuffs mentioned in the preceding examples may likewise be used for the dyeing of acid-modified aromatic polyester fibres according to the methods described in Examples 8 and 9 thus yielding valuable shades which are similar or equal to the shades obtained on polyacrylics.

EXAMPLE 10

Fibres of polyacrylonitrile are introduced at 40° C. into an aqueous bath having a goods-to-liquor ratio 1:40 and containing, per litre, 0.75 g. of a 30% acetic acid, 0.38 g. sodium acetate and 0.3 g. of the aminodiphenyl-indolyl-methane dyestuff of the formula

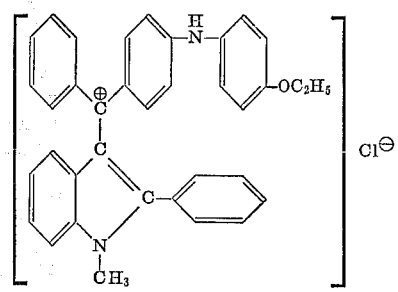

the preparation of which is described below. The bath is heated to boiling temperature within 20–30 minutes and kept at this temperature for 30–60 minutes. The polyacrylonitrile fibres are subsequently rinsed and dried. A bluish green dyeing of very good light fastness is obtained which is also distinguished by a very good fastness to cross-dyeing in an acetic acid and sulphuric acid bath.

The dyestuff was obtained in the following manner: 216 parts by weight 4-chlorobenzophenone and 207 parts by weight 1-methyl-2-phenylindole are dissolved at 70° C. in 1800 parts by volume of chlorobenzene, followed by the addition of 160 parts by weight of anhydrous zinc chloride. 306 parts phosphorus oxychloride are subsequently introduced into the reaction mixture which is stirred at 120–125° C. for 18 hours. The compound, which precipitates in crystalline form upon cooling, is stirred for some time, filtered off with suction, washed with cold chlorobenzene and dried. 20 parts by weight of this compound are introduced into 60 parts by weight 4-phenetidine heated to 90° C. and the melt, which instantly adopts a blue-green colour, is stirred at 100° C. for 3 hours. The hot melt is poured on to 500 parts by volume of ice-water and 50 parts by volume hydrochloric acid ($d = 1.19$), whereupon the dyestuff precipitates in crystalline form. After stirring for several hours, it is filtered off with suction and purified by recrystallisation from 10% acetic acid with the addition of sodium chloride.

With the same good result, those dyestuffs can also be used for the dyeing of polyacrylonitrile which are obtained by the reaction of the aromatic amines set out in the table below with the condensation product of 4-chlorobenzophenone and 1-methyl-2-phenyl-indole.

| Aniline derivative: | Shade of dyeing on polyacryonitrile |
|---|---|
| Aniline | Bluish green. |
| 4-hydroxyethoxyaniline | Do. |
| 4-toluidine | Do. |
| 3-toluidine | Do. |
| 2-toluidine | Greenish blue. |
| 4-chloroaniline | Bluish green. |
| 2-chloroaniline | Blue-green. |
| 3-chloroaniline | Greenish blue. |
| 1-amino-4-methyl-3-chlorobenzene | Bluish green. |
| 3,4-dichloroaniline | Strongly bluish green. |
| 4-methylsulphonylaniline | Bluish green. |
| N-acetylphenylenediamine-1,4 | Turquoise. |
| 4-anisidine | Bluish green. |
| 3-anisidine | Do. |
| 2-amino-1,3-diethylbenzene | Greenish blue. |
| 5-amino-1,3-di(trifluoromethyl)-benzene | Grey-blue. |
| 4-amino-3-methyl-1-cyclohexylbenzene | Green-blue. |
| 5-amino-1,3-dimethylbenzene | Bluish green. |
| 2,6-diisopropylaniline | Greenish blue. |
| 2-amino-1-ethylbenzene | Green-blue. |
| 4-amino-1,3-dimethylbenzene | Do. |
| 2-isopropylaniline | Do. |
| 2-amino-1,4-dimethylbenzene | Do. |

EXAMPLE 11

A fabric of polyacrylonitrile is printed with a printing paste which was prepared in the following manner:

330 parts by weight of hot water are poured over 30 parts by weight of the amino-diphenyl-indolyl-methane dyestuff of the formula

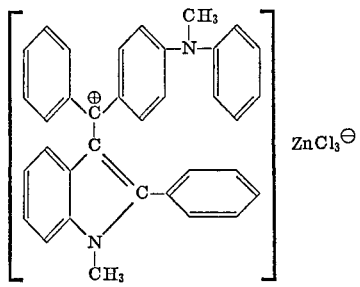

the preparation of which is described below 50 parts by weight thiodiethylene glycol, 30 parts by weight cyclohexanol and 30 parts by weight 30% acetic acid, and the resultant solution is added to 500 parts by weight of crystal gum (gum arabic as thickening agent). Finally, 30 parts by weight of a zinc nitrate solution are also added. The resultant print is dried, steamed for 30 minutes and subsequently rinsed. A bluish green print with very good fastness properties is obtained.

The dyestuff is obtained as follows:

37.8 parts by weight N-phenyl-N-methylaminobenzophenone, 27.2 parts by weight 1-methyl-2-phenyl-indole and 35 parts by weight phosphorus oxychloride are heated together to 100° C. and the mixture is kept at this temperature for 3 hours. The hot melt is added to 600 parts by volume of warm water at 50° C. and the pH value is adjusted to 2 by the addition of 140 parts by volume of a 20% sodium acetate solution. The precipitation of the dyestuff is completed by the addition of 30 parts by weight of sodium chloride and the reaction mixture is stirred for some hours. The dye resin is separated, dissolved in 4000 parts by volume of boiling water, the solution is clarified with active charcoal and the dyestuff precipitated, when the solution is somewhat cooler, by the addition of 90 parts by volume of a solution of zinc chloride in an equal amount by weight of water. The dyestuff is stirred for some time, filtered off with suction and washed with a 10% sodium chloride solution.

With the same good result, the dyestuffs can be used which were obtained by the reaction of the indole derivatives set out in the table below, instead of 1-methyl-2-phenylindole:

| Indole derivative: | Hade on polyacrylonitrile fibres. |
|---|---|
| 2-phenylindole | Bluish green. |
| 2-methylindole | Greenish blue. |
| 1,2-dimethylindole | Do. |
| 1-methyl-2-phenyl-5-methoxyindole | Blue-green. |
| 1-ethyl-2-phenyl-indole | Bluish green. |
| 1-ethyl-2-methyl-indole | Blue. |
| 1-ethyl-2-phenyl-5-methyl-indole | Green-blue. |
| 1,5-dimethyl-2-phenyl-indole | Bluish green. |
| 1-cyanoethyl-2-phenyl-indole | Do. |
| 1-cyanoethyl-2-methyl-indole | Do. |
| 1-ethyl-2-phenyl-7-chloro-indole | Do. |
| 1,6-dimethyl-2-phenyl-indole | Do. |
| 1-isobutyl-2-phenylindole | Do. |
| 1-ethyl-2-phenyl-6-methylindole | Do. |
| 1-n-butyl-2-phenyl-6-methylindole | Do. |
| 1-n-butyl-2-phenyl-indole | Do. |

EXAMPLE 12

Fibres of polyacrylonitrile are introduced at 40° into an aqueous bath having a goods-to-liquor ratio 1:40 and containing, per litre, 0.75 g. 30% acetic acid, 0.38 g. sodium acetate and 0.3 g. of the aminodiphenylindolylmethane dyestuff of the formula

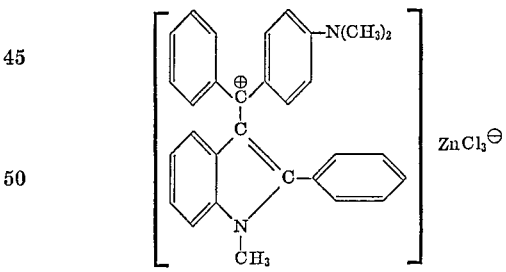

the preparation of which is described below. The bath is heated to boiling temperature within 20–30 minutes and kept at this temperature for 30–60 minutes. The polyacrylonitrile fibres are subsequently rinsed and dried. They show a greenish blue dyeing of very good fastness to light.

The dyestuff was obtained in the following manner:

45 parts by weight 4-dimethyl aminobenzophenone, 41.4 parts by weight 1-methyl-2-phenylindole and 50 parts by weight phosphorus oxychloride are mixed and the mixture is heated at 100° C. for 3 hours. The hot melt is poured onto 1000 parts by volume of water at 50° C. and the reaction mixture adjusted to a pH of 2 with 320 parts by volume of a 20% sodium acetate solution. When the solution has cooled, the dyestuff is precipitated by the addition of 100 parts by weight sodium chloride and 150 parts by volume of a solution of zinc chloride in an equal amount by weight of water. For further purification the dyestuff is dissolved in boiling water, clarified with active charcoal and precipitated by the addition of 30 parts by volume of a zinc chloride solution.

With the same good result, those dyestuffs can be used for the dyeing of polyacrylonitrile which are obtained by the reaction of the aminobenzophenone compounds set out in the table below with the indoles indicated:

| Aminobenzophenone | Indole | Shade on polyacrylonitrile |
|---|---|---|
| 4-dimethylaminobenzophenone | 1,2-dimethylindole | Bluish violet. |
| Do | 2-methyl-1-ethyl-6,7-benzoindole | Blue-grey. |
| 4-diethylaminobenzophenone | 1-methyl-2-phenylindole | Blue. |
| Do | 2-methylindole | Violet. |
| Do | 2-phenylindole | Green-blue. |
| Do | 2-methyl-1-ethyl-6,7-benzoindole | Grey-violet. |
| 4-dimethylamino-4'-methoxybenzophenone | 1-methyl-2-phenylindole | Bluish grey. |
| 4-dimethylamino-4'-methylbenzophenone | 1,2-dimethylindole | Reddish violet. |
| Do | 1-methyl-2-phenylindole | Greenish blue. |
| 4-dimethylamino-3'-chlorobenzophenone | 1,2-dimethylindole | Reddish blue. |
| Do | 1-methyl-2-phenylindole | Blue. |
| 4-dimethylamino-2'-chlorobenzophenone | 1,2-dimethylindole | Reddish blue. |
| Do | 1-methyl-2-phenylindole | Blue. |
| 4-diethylaminobenzophenone | 1,2-dimethylindole | Blue-violet. |
| 4-diethylamino-4'-methylbenzophenone | do | Bluish violet. |
| Do | 1-methyl-2-phenylindole | Blue-green. |
| 4-diethylamino-4'-methoxybenzophenone | 1,2-dimethylindole | Bordeaux. |
| Do | 1-methyl-2-phenylindole | Greenish grey. |
| 4-diethylamino-3'-chlorobenzophenone | 1,2-dimethylindole | Blue. |
| Do | 1-methyl-2-phenylindole | Strongly greenish blue. |
| 4-dimethylamino-3'-methylbenzophenone | 1,2-dimethylindole | Reddish violet. |
| Do | 1-methyl-2-phenylindole | Reddish blue. |
| 4-phenylmethylamino-2'-chlorobenzophenone | 1,2-dimethylindole | Greenish blue. |
| Do | 1-methyl-2-phenylindole | Turquoise. |
| 4-(4'-ethoxyphenyl)-methylaminobenzophenone | 1,2-dimethylindole | Greenish blue. |
| Do | 1-methyl-2-phenylindole | Bluish green. |
| Do | 2-methylindole | Blue. |
| 4-dimethylamino-4'-methoxybenzophenone | do | Bordeaux. |
| Do | 2-phenylindole | Reddish black. |
| 4-dimethylamino-4'-methylbenzophenone | 2-methylindole | Bluish bordeaux. |
| Do | 2-phenylindole | Blue-green. |
| 4-dimethylamino-3'-chlorobenzophenone | 2-methylindole | Reddish blue. |
| Do | 2-phenylindole | Greenish blue. |
| 4-dimethylamino-2'-chloro-benzophenone | 2-methylindole | Bluish violet. |
| Do | 2-phenylindole | Greenish blue. |
| 4-diethylamino-4'-methylbenzophenone | 2-methylindole | Violet. |
| 4-dimethylamino-2',5'-dichloro-benzophenone | 1,2-dimethylindole | Blue. |
| Do | 1-methyl-2-phenylindole | Greenish blue. |
| Do | 2-methylindole | Reddish blue. |
| Do | 2-phenylindole | Greenish blue. |
| 4-dimethylamino-3'-methyl-4'-nitrobenzophenone | 1,2-dimethylindole | Do. |
| Do | 1-methyl-2-phenylindole | Blue-green. |
| 4-(p-ethoxyphenyl)-methylamino-4'-methoxybenzophenone | 1,2-dimethylindole | Black-grey. |
| Do | 1-methyl-2-phenylindole | Blue-green. |
| Do | 2-methylindole | Currant-grey. |
| Do | 2-phenylindole | Grey-green. |
| 4-diethylamino-2'-chloro-benzophenone | 1,2-dimethyl indole | Blue. |
| Do | 1-methyl-2-phenylindole | Greenish blue. |
| 4-dimethylamino-4'-chloro-benzophenone | 1,2-dimethylindole | Do. |
| Do | 1-methyl-2-phenylindole | Blue-green. |
| 4-diethylamino-4'-chloro-benzophenone | 1,2-dimethylindole | Greenish blue. |
| Do | 1-methyl-2-phenylindole | Blue-green. |
| 4-cyanoethyl-methylaminobenzophenone | 1,2-dimethylindole | Violet. |
| Do | 1-methyl-2-phenylindole | Greenish blue. |
| 4-diethylamino-3'-methylbenzophenone | 1,2-dimethylindole | Reddish blue. |
| Do | 1-methyl-2-phenylindole | Greenish blue. |
| 4-(p-ethoxyphenyl)methyl-amino-4'-methylbenzophenone | 1,2-dimethylindole | Do. |
| Do | 1-methyl-2-phenylindole | Bluish green. |
| 4-phenylmethyl-amino-4'-methoxy-benzophenone | 1,2-dimethylindole | Currant. |
| Do | 1-methyl-2-phenylindole | Grey-green. |
| 4-(p-ethoxyphenyl)methylamino-3'-chlorobenzophenone | 1,2-dimethylindole | Greenish blue. |
| Do | 1-methyl-2-phenylindole | Bluish green. |
| 4-diethylamino-2'-chloro-benzophenone | 2-methylindole | Reddish blue. |
| Do | 2-phenylindole | Greenish blue. |
| 4-cyanoethyl-methylaminobenzophenone | do | Blue-green. |
| Do | 2-methylindole | Reddish violet. |
| 4-dimethylamino-4'-chloro-benzophenone | do | Bluish violet. |
| Do | 2-phenylindole | Blue-green. |
| 4-phenylmethylamino-3'-nitro-4'-methylbenzophenone | 1,2-dimethylindole | Greenish blue. |
| Do | 1-methyl-2-phenylindole | Bluish green. |
| 4-phenylmethylamino-3'-chlorobenzophenone | do | Do. |
| Do | 1,2-dimethylindole | Greenish blue. |
| 4-phenylmethylamino-4'-methyl-benzophenone | do | Do. |
| Do | 1-methyl-2-phenylindole | Bluish green. |
| 4-phenylmethylamino-2',5'-dichlorobenzophenone | do | Do. |
| Do | 1,2-dimethylindole | Greenish blue. |
| 4-phenylmethylamino-4'-chlorobenzophenone | do | Do. |
| Do | 1-methyl-2-phenylindole | Green. |
| 4-phenylmethylamino-3'-methylbenzophenone | do | Bluish green. |
| Do | 1,2-dimethylindole | Greenish blue. |
| 4-diethylamino-4'-methoxybenzophenone | 2-methylindole | Garnet. |
| Do | 2-phenylindole | Greenish grey-black. |
| 4-diethylamino-3'-chloro-benzophenone | do | Blue-green. |
| Do | 2-methylindole | Reddish blue. |
| 4-diethylamino-4'-chloro-benzophenone | do | Reddish dark-blue. |
| Do | 2-phenylindole | Blue-green. |
| 4-diethylamino-3'-methylbenzophenone | do | Do. |
| Do | 2-methylindole | Bluish violet. |
| 4-phenylmethylamino-4'-methoxy-benzophenone | do | Currant. |
| Do | 2-phenylindole | Greenish blue-grey. |
| 4-phenylmethylamino-4'-methylbenzophenone | do | Bluish green. |
| Do | 2-methylindole | Blue-grey. |
| 4-dimethylamino-3'-nitro-4'-methylbenzophenone | do | Reddish dark blue. |
| Do | 2-phenylindole | Blue-green. |
| 4-phenylmethylamino-2',5'-dichlorobenzophenone | 2-methylindole | Greenish blue. |
| Do | 2-phenylindole | Bluish green. |
| 4-dimethylamino-3'-methyl-4'-methoxybenzophenone | 1,2-dimethylindole | Blue-grey. |
| Do | 1-methyl-2-phenylindole | Bluish green. |
| 4-dimethylamino-3'-methyl-4'-nitrobenzophenone | 1,2-dimethylindole | Greenish blue. |
| Do | 1-methyl-2-phenylindole | Blue-green. |
| 4-dimethylamino-3'-nitro-benzophenone | do | Greenish blue. |
| Do | 1,2-dimethylindole | Blue. |
| 4-dimethylamino-3'-nitro-4'-methoxybenzophenone | 2-methylindole | Currant-blue. |
| Do | 2-phenylindole | Bluish green. |

| Aminobenzophenone | Indole | Shade on polyacrylonitrile |
|---|---|---|
| 4-dimethylamino-3'-methyl-4'-nitrobenzophenone | do | Do. |
| Do | 2-methylindole | Greenish blue. |
| 4-dimethylamino-3'-nitrobenzophenone | do | Reddish blue. |
| Do | 2-phenylindole | Greenish blue. |
| 4-diethylamino-3'-nitro-4'-methoxybenzophenone | 1,2-dimethylindole | Do. |
| Do | 1-methyl-2-phenylindole | Bluish green. |
| 4-diethylamino-3'-methyl-4'-nitrobenzophenone | 1,2-dimethylindole | Greenish blue. |
| Do | 1-methyl-2-phenylindole | Blue-green. |
| 4-diethylamino-3'-nitro-benzophenone | do | Greenish blue. |
| Do | 1,2-dimethylindole | Blue. |
| 4-diethylamino-2',5'-dichloro-benzophenone | do | Do. |
| Do | 1-methyl-2-phenylindole | Greenish blue. |
| 4-dimethylamino-2'-chloro-benzophenone | 1-ethyl-2-methylindole | Reddish blue. |
| 4-dimethylamino-2',5'-dichloro-benzophenone | do | Blue. |
| 4-phenylmethylamino-2',5'-dichlorobenzophenone | do | Greenish blue. |
| 4-diethylamino-2'-chloro-benzophenone | do | Blue. |
| 4-phenylmethylamino-2'-chloro-benzophenone | do | Greenish blue. |
| 4-diethylaminobenzophenone | do | Reddish blue. |
| 4-dimethylamino-4'-methoxybenzophenone | do | Garnet. |
| 4-dimethylamino-3'-chloro-benzophenone | do | Reddish blue. |
| 4-phenylmethylamino-4'-methoxybenzophenone | do | Currant. |
| 4-phenylmethylamino-4'-methylbenzophenone | do | Greenish blue. |
| 4-di-n-propylaminobenzophenone | 1,2-dimethylindole | Reddish blue. |
| Do | 1-methyl-2-phenylindole | Greenish blue. |
| 4-dimethylamino-2'-chloro-benzophenone | 1-ethyl-2-phenylindole | Do. |
| 4-dimethylamino-2',5'-dichlorobenzophenone | do | Do. |
| 4-dimethylamino-2'-chlorobenzophenone | do | Do. |
| 4-phenylmethylamino-2'-chlorobenzophenone | do | Green-blue. |
| 4-diethylaminobenzophenone | 1,5-dimethyl-2-phenylindole | Blue-green. |
| 4-dimethylamino-2'-chlorobenzophenone | do | Greenish blue. |
| 4-dimethylamino-2',5'-dichlorobenzophenone | do | Do. |
| 4-dimethylamino-2'-chlorobenzophenone | do | Do. |
| 4-phenylmethylamino-2'-chlorobenzophenone | do | Bluish green. |
| 4-dimethylamino-2'-chlorobenzophenone | 1-ethyl-2-phenyl-5-methylindole | Greenish blue. |
| 4-diethylamino-2'-chlorobenzophenone | do | Do. |
| 4-dimethylamino-2',5'-dichlorobenzophenone | do | Do. |
| 4-p-ethoxyphenylmethylaminobenzophenone | 1-ethyl-2-methylindole | Green-blue. |
| Do | do | Bluish green. |
| 4-diethylaminobenzophenone | 1-cyanoethyl-2-phenylindole | Dark blue. |
| 4-dimethylamino-2'-chlorobenzophenone | do | Greenish blue. |
| 4-dimethylamino-4'-methoxybenzophenone | 1-cyanoethyl-2-phenylindole | Currant. |
| 4-diethylaminobenzophenone | 1-cyanoethyl-2-methylindole | Reddish dark blue. |
| 4-dimethylamino-4'-methoxybenzophenone | do | Currant-blue. |
| 4-diethylamino-4'-methoxybenzophenone | do | Do. |
| 4-di-n-propylamino-2',5'-dichlorobenzophenone | 1,2-dimethylindole | Greenish blue. |
| Do | 1-methyl-2-phenylindole | Do. |
| 4-di-n-propylamino-2'-chlorobenzophenone | do | Blue. |
| Do | 1,2-dimethylindole | Do. |
| 4-diethylaminobenzophenone | 1-ethyl-2-phenyl-7-chloroindole | Blue-grey. |
| 4-N-phenylmethylamino-2'-chlorobenzophenone | 1-cyanoethyl-2-phenylindole | Blue-green. |
| 4-(N-p-ethoxyphenyl-N-methyl)-aminobenzophenone | do | Do. |
| 4-phenylmethylamino-2'-chlorobenzophenone | 1-cyanoethyl-2-methylindole | Greenish blue. |
| 4-(N-p-ethoxyphenyl-N-methyl)-aminobenzophenone | do | Blue-green. |
| 4-(p-methylphenylmethyl)-aminobenzophenone | 1-methyl-2-phenylindole | Bluish green. |
| Do | 1,2-dimethylindole | Greenish blue. |
| 4-N-(p-ethoxyphenylmethylamino)-2'-chlorobenzophenone | do | Do. |
| Do | 1-methyl-2-phenylindole | Bluish green. |
| 4-diethylaminobenzophenone | 1,6-dimethyl-2-phenylindole | Blue-green. |
| 4-diethylamino-4'-methoxybenzophenone | do | Greenish grey. |
| 4-diethylamino-2'-chlorobenzophenone | do | Greenish blue. |
| 4-diethylaminobenzophenone | 1-isobutyl-2-phenylindole | Do. |
| 4-diethylamino-4'-methoxybenzophenone | do | Blue-grey. |
| 4-diethylamino-2'-chlorobenzophenone | do | Greenish blue. |
| 4-phenylmethylamino-2'-chlorobenzophenone | 2-phenylindole | Olive. |
| Do | 2-methylindole | Greenish blue. |
| Do | 1-isobutyl-2-phenylindole | Bluish green. |
| Do | 1,7-dimethyl-2-phenylindole | Do. |
| 4-diethylaminobenzophenone | 1-ethyl-2-phenyl-6-methylindole | Blue-green. |
| 4-diethylamino-4'-methoxybenzophenone | do | Greenish grey. |
| 4-diethylamino-2'-chlorobenzophenone | do | Greenish blue |
| 4-phenylmethylamino-2'-chlorobenzophenone | do | Bluish green. |
| 4-diethylaminobenzophenone | 1-n-butyl-2-phenyl-6-methylindole | Blue-green. |
| 4-diethylamino-4'-methoxybenzophenone | do | Grey-green. |
| 4-diethylamino-2'-chlorobenzophenone | do | Greenish blue. |
| 4-phenylmethylamino-2'-chlorobenzophenone | do | Bluish green. |
| 4-diethylaminobenzophenone | 1-benzyl-2-phenyl-7-methylindole | Do. |
| Do | 1-benzyl-2-phenylindole | Grey-green. |
| 4-N-(cyanoethylmethyl)-amino-2'-chlorobenzophenone | 1,2-dimethylindole | Bluish violet. |
| Do | 1-methyl-2-phenylindole | Greenish blue. |
| 4-diethylaminobenzophenone | 1-n-butyl-2-phenylindole | Do. |
| 4-diethylamino-4'-methoxy-benzophenone | do | Reddish blue-grey. |
| 4-diethylamino-2'-chlorobenzophenone | do | Greenish blue. |
| 4-phenylmethylamino-2'-chlorobenzophenone | do | Blue-green. |
| 4-N-(cyanoethylmethyl)-amino-2'-chlorobenzophenone | 2-phenylindole | Greenish blue. |
| Do | 2-methylindole | Bluish violet. |
| 4-phenylmethylamino-3-bromobenzophenone | 1,2-dimethylindole | Greenish blue. |
| Do | 1-methyl-2-phenylindole | Bluish green. |
| 4-dimethylamino-3-bromobenzophenone | 1,2-dimethylindole | Reddish violet. |
| Do | 1-methyl-2-phenylindole | Greenish blue. |
| 4-diethylamino-3-bromo-2'-chlorobenzophenone | 1,2-dimethylindole | Reddish blue. |
| Do | 1-methyl-2-phenylindole | Greenish blue. |
| 4-diethylamino-3-bromo-4'-methoxybenzophenone | 1,2-dimethylindole | Bordeaux. |
| Do | 1-methyl-2-phenylindole | Greenish dark grey. |
| 4-diethylamino-3-bromobenzophenone | 1,2-dimethylindole | Bluish violet. |
| Do | 1-methyl-2-phenylindole | Greenish blue. |
| 4-dimethylamino-2-methylbenzophenone | do | Bluish green. |
| Do | 1,2-dimethylindole | Greenish blue. |
| Do | 1-ethyl-2-phenylindole | Bluish green. |
| 4-diethylamino-2'-bromobenzophenone | 1,2-dimethylindole | Greenish blue. |
| Do | 1-methyl-2-phenylindole | Do. |
| Do | 1-ethyl-2-phenylindole | Do. |
| 4-phenylmethylamino-2'-bromobenzophenone | 1-methyl-2-phenylindole | Bluish green. |
| Do | 1,2-dimethylindole | Greenish blue. |
| Do | 1-ethyl-2-phenylindole | Bluish green. |
| 4-amino-2'-chlorobenzophenone | 1,2-dimethylindole | Bluish red. |
| Do | 1-methyl-2-phenylindole | Bluish violet. |
| 4-dimethylamino-2-methyl-2'-bromobenzophenone | 1,2-dimethylindole | Greenish blue. |
| Do | 1-methyl-2-phenylindole | Do. |

| Aminobenzophenone | Indole | Shade on polyacrylonitrile |
|---|---|---|
| 4-dimethylamino-2-methyl-2'-chloro benzophenone | 1,2-dimethylindole | Violet-tinted blue. |
| Do | 1-methyl-2-phenylindole | Greenish blue. |
| 4-N-β-chloroethyl-N-methylamino-2-methylbenzophenone | 1,2-dimethylindole | Reddish blue. |
| Do | 1-methyl-2-phenylindole | Bluish green. |
| 4-dimethylamino-2-methyl-4'-methoxybenzophenone | do | Grey-green. |
| Do | 1,2-dimethylindole | Violet-tinted black grey. |
| 4-benzyl-ethylamino-2-methylbenzophenone | 1-methyl-2-phenylindole | Bluish green. |
| Do | 1,2-dimethylindole | Greenish blue. |
| 4-diethylamino-2-ethoxybenzophenone | 1-methyl-2-phenylindole | Blue. |
| Do | 1,2-dimethylindole | Reddish blue. |
| 4-N-(4'-ethoxyphenyl)-N-methylamino-2'-chlorobenzophenone | 2-methylindole | Blue. |
| 2-chloro-4'-dibenzylaminobenzophenone | 1-methyl-2-phenylindole | Greenish blue. |
| Do | 1,2-dimethylindole | Reddish blue. |
| Do | 2-phenylindole | Blue-green. |
| 4-methyl-4'-ethylbenzylaminobenzophenone | 1-methyl-2-phenylindole | Bluish green. |
| Do | 1,2-dimethylindole | Bluish bordeaux. |
| 2-chloro-4'-ethylbenzylaminobenzophenone | do | Greenish blue. |
| Do | 1-methyl-2-phenylindole | Do. |
| 4-ethylbenzylaminobenzophenone | do | Blue-green. |
| Do | 1,2-dimethylindole | Reddish blue. |
| 2-chloro-4'-methylbenzylaminobenzophenone | 1-methyl-2-phenylindole | Greenish blue. |
| 2-chloro-4'-ethylbenzylaminobenzophenone | 2-phenylindole | Bluish green. |
| Do | 2-methylindole | Blue-grey. |
| 4-ethylbenzylaminobenzophenone | do | Reddish blue. |
| Do | 2-phenylindole | Blue-green. |
| 4-phenylmethylamino-3'-bromobenzophenone | 1-methyl-2-phenylindole | Greenish blue-grey. |
| Do | 1,2-dimethylindole | Bluish bordeaux. |
| 4-ethylbenzylamino-2-methyl-2'-bromobenzophenone | 1-methyl-2-phenylindole | Greenish blue. |
| Do | 1,2-dimethylindole | Do. |
| 4-amino-2',5'-dichlorobenzophenone | 1-methyl-2-phenylindole | Red-violet. |
| Do | 1,2-dimethylindole | Yellowish red. |
| 4-diethylamino-2-ethyl-4'-methoxybenzophenone | do | Currant-grey. |
| Do | 1-methyl-2-phenylindole | Grey-green. |
| 4-ethylbenzylamino-2'-methyl-4'-methoxybenzophenone | do | Bluish green. |
| Do | 1,2-dimethylindole | Grey-green. |
| 4-diethylamino-2-ethoxy-2'-chlorobenzophenone | 1-methyl-2-phenylindole | Greenish blue. |
| Do | 1,2-dimethylindole | Bluish violet. |
| 4-chloroethyl-n-butylaminobenzophenone | do | Reddish blue. |
| Do | 1-methyl-2-phenylindole | Greenish blue. |
| 4-chloroethyl-methylaminobenzophenone | 1,2-dimethylindole | Reddish blue. |
| Do | 1-methyl-2-phenylindole | Greenish blue. |
| 4-di-n-propylaminobenzophenone | 1-n-butyl-2-phenyl-6-methylindole | Blue-green. |
| Do | 1-n-butyl-2-phenylindole | Greenish blue. |
| 4-α-naphthyl-methylamino-4'-methoxybenzophenone | 1-methyl-2-phenylindole | Greenish grey. |
| Do | 1,2-dimethylindole | Bluish violet. |
| 4-α-naphthyl-methylamino-benzophenone | do | Greenish blue. |
| Do | 1-methyl-2-phenylindole | Bluish green. |
| 4-α-naphthyl-methylamino-2'-chlorobenzophenone | do | Blue-green. |
| Do | 1,2-dimethylindole | Greenish blue. |
| 4-ethylbenzylamino-2'-bromobenzophenone | 1-methyl-2-phenylindole | Do. |
| Do | 1,2-dimethylindole | Blue. |
| 4-diethylamino-2'-methoxybenzophenone | 1-methyl-2-phenylindole | Greenish blue. |
| Do | 1,2-dimethylindole | Do. |
| 4-α-naphthyl-methylamino-2'-bromobenzophenone | 1-methyl-2-phenylindole | Blue-green. |
| Do | 1,2-dimethylindole | Greenish blue. |
| 4-diethylamino-2'-methylbenzophenone | 1-methyl-2-phenylindole | Do. |
| Do | 1,2-dimethylindole | Bluish violet. |
| 4-phenylmethylamino-2'-methoxybenzophenone | 1-methyl-2-phenylindole | Bluish green. |
| Do | 1,2-dimethylindole | Greenish blue. |
| 4-β-chloroethyl-ethylamino-2-methyl-2'-chlorobenzophenone | 1-methyl-2-phenylindole | Bluish green. |
| Do | 1,2-dimethylindole | Greenish blue. |
| 4-phenylmethylamino-2'-methylbenzophenone | 1-methyl-2-phenylindole | Blue-green. |
| Do | 1,2-dimethylindole | Blue. |
| 4-diethylamino-3'-methoxybenzophenone | 1-methyl-2-phenylindole | Greenish blue. |
| Do | 1,2-dimethylindole | Reddish blue. |
| 4-ethyl-benzylamino-4'-methoxybenzophenone | 1-methyl-2-phenylindole | Greenish grey. |
| Do | 1,2-dimethylindole | Currant. |
| 4-phenylmethyl-amino-3'-methoxybenzophenone | 1-methyl-2-phenylindole | Green. |
| Do | 1,2-dimethylindole | Greenish blue. |
| 4-ethyl-benzylamino-2'-methylbenzophenone | 1-methyl-2-phenylindole | Do. |
| Do | 1,2-dimethylindole | Reddish blue. |
| 4-ethyl-benzylamino-2'-methoxybenzophenone | 1-methyl-2-phenylindole | Greenish blue. |
| Do | 1,2-dimethylindole | Violet-tinted blue. |
| 4-ethylbenzylamino-4'-chlorobenzophenone | 1-methyl-2-phenylindole | Green-blue. |
| Do | 1,2-dimethylindole | Blue. |
| 4-phenylmethylamino-4'-phenylbenzophenone | 1-methyl-2-phenylindole | Green. |
| Do | 1,2-dimethylindole | Grey. |
| 4-diethylamino-4'-phenylbenzophenone | 1-methyl-2-phenylindole | Green. |
| Do | 1,2-dimethylindole | Blue-grey. |
| 4-β-chloroethyl-ethylamino-4'-methoxybenzophenone | 1-methyl-2-phenylindole | Grey-green. |
| Do | 1,2-dimethylindole | Currant-grey. |

EXAMPLE 13

Fibres of polyacrylonitrile are introduced into an aqueous bath having a goods-to-liquor ratio 1:40 and containing, per litre, 0.75 g. 30% acetic acid, 0.38 g. sodium acetate and 0.3 g. of the aminodiphenyl-indolyl-methane dyestuff of the formula

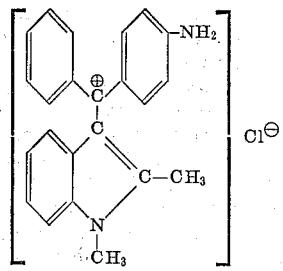

the preparation of which is described below. The bath is heated to boiling temperature within 20–30 minutes and kept at this temperature for 30–60 minutes. The polyacrylonitrile fibres are subsequently rinsed and dried. They exhibit a bluish red dyeing of very good light fastness.

The dyestuff was obtained as follows:

19.7 parts by weight 4-aminobenzophenone and 14.5 parts by weight 1,2-dimethylindole are introduced into 200 parts by weight of alcohol, and 50 parts by weight of concentrated hydrochloric acid ($d=1.19$) are added at 30° C. to the reaction mixture. When the mixture has been heated to 80° C., it is stirred at the same temperature for 3 hours. 120 parts by volume of alcohol are subsequently distilled off and the deep-coloured residue is added to a mixture of 250 parts by volume of a saturated sodium chloride solution and 250 parts by weight of ice. The dyestuff suspension is stirred overnight, filtered off with suction and the dyestuff is purified by recrystallisation from water and precipitation with sodium chloride.

With the same good result, those dyestuffs can be used for the dyeing of polyacrylonitrile which are obtained by the reaction of the indoles set out in the following table with 4-amino-benzophenone:

| Indole: | Shade of the dyeing on polyacrylonitrile |
|---|---|
| 2-methylindole | Red-violet. |
| 1-methyl-2-phenylindole | Blue-violet. |
| 1-ethyl-2-methylindole | Bluish ruby. |
| 1-ethyl-2-phenylindole | Bluish violet. |
| 1,5-dimethyl-2-phenylindole | Do. |
| 1-ethyl-2-phenyl-5-methylind | Do. |
| 1-cyanoethyl-2-phenylindole | Reddish violet. |

Instead of 4-aminobenzophenone the nuclearly substituted 4-aminobenzophenones can be reacted with the indoles in the described manner thus yielding the following shades:

| Benzophenones | Indoles | Shade on polyacrylonitrile |
|---|---|---|
| 4-amino-3,5-dibromo-benzophenone | 1,2-dimethylindole | Bluish pink. |
| 4-amino-3-bromobenzophenone | do | Reddish bordeaux. |
| 4-amino-3,5-dibromo-benzophenone | 1-methyl-2-phenylindole | Reddish violet. |
| Do | 2-methylindole | Bluish pink. |
| 4-amino-2'-chlorobenzophenone | 1,2-dimethylindole | Bluish red. |
| 4-amino-4'-methoxybenzophenone | do | Red. |
| Do | 2-methylindole | Red. |
| Do | 1-methyl-2-phenylindole | Red-bordeaux. |
| 4-amino-2',5'-dimethylbenzophenone | do | Reddish violet. |
| Do | 2-methylindole | Bluish ruby. |
| Do | 1,2-dimethylindole | Do. |

EXAMPLE 14

A stock solution is prepared from 15 parts by weight of the dyestuff mentioned in Example 11, 15 parts by weight polyacrylonitrile and 70 parts by weight dimethylformamide, this solution is added to a conventional spinning solution of acrylonitrile and spun in known manner. A bluish green dyeing of very good fastness properties is obtained.

EXAMPLE 15

Fibres of polyacrylonitrile are introduced at 40° C. into an aqueous bath having a goods-to-liquor ratio 1:40 and containing, per litre, 0.75 g. 30% acetic acid, 0.38 g. sodium acetate and 0.3 g. of an aminodiphenyl-indolyl-methane dyestuff, the preparation of which is described below. The bath is heated to boiling temperature within 20-30 minutes and kept at the same temperature for 30-60 minutes. The polyacrylonitrile fibres are subsequently rinsed and dried. They are dyed in a Bordeaux shade of very good fastness properties.

The dyestuff was obtained in the following manner:

10 parts by weight 4-dimethylamino-4'-methoxybenzophenone and 5.7 parts by weight 1,2-dimethylindole are stirred with 15 parts by weight phosphorus oxychloride at 100° C. for 2 hours. The hot melt is stirred into 500 parts by volume of water. The dyestuff is then salted out with 20 parts by weight of sodium chloride. The aqueous solution is separated from the dye resin, the dyestuff dissolved in 500 parts of boiling water and precipitated with 10 parts by weight of zinc chloride and 20 parts by weight of sodium chloride in the form of a zinc double salt.

EXAMPLE 16

Acid-modified polyglycol terephthalate fibres of the type Dacron® 64 (E. I. du Pont de Nemours and Company) and as, for instance, described in the Belgian patent specification 549,179 and the U.S. patent specification 2,893,816 are introduced at 20° C. into a dye-bath containing per litre 3 g. of sodium sulphate, 0.5 to 2 g. of an oleylpolyglycol ether, prepared with 50 mol of ethyleneoxide, 2.5 to 5 g. of diphenyl and 0.3 g. of the dyestuff of Example 10 and which has been adjusted to a pH of 4.5 to 5.5 with acetic acid. The liquor-to-goods ratio is 40:1. The temperature of the dye-bath is heated within 30 minutes to 98° C. and the bath kept at this temperature for 60 minutes. The dyed fibres are subsequently rinsed with water and dried. A bluish green dyeing of very good fastness properties is obtained.

EXAMPLE 17

Acid-modified polyglycol terephthalate fibres as described in Example 16 are introduced at 20° C. into a dye-bath containing per litre 6 to 10 g. of sodium sulphate, 0.5 to 1 g. of an oleylpolyglycol ether prepared with 50 mol of ethyleneoxide, 0 to 15 g. of dimethylbenzyl-dodecyl-ammoniumchloride and 0.3 g. of the dyestuff of Example 10 and which has been adjusted to a pH of 4 to 5 with acetic acid. The liquor-to-goods ratio is 40:1. The temperature of the dye-bath is heated within 30 minutes to 120° C. and the bath kept at this temperature for 60 minutes. The dyed fibres are subsequently rinsed with water and dried. One obtains a bluish green dyeing of very good fastness properties.

The dyestuffs mentioned in the preceding examples may likewise be used for the dyeing of acid-modified aromatic polyester fibres according to the methods described in Examples 16 and 17 thus yielding valuable shades which are similar or equal to the shades obtained on polyacrylics.

We claim:

1. An aminodiphenyl-indolyl-methane dyestuff free of sulfonic acid and carboxylic acid groups having the formula

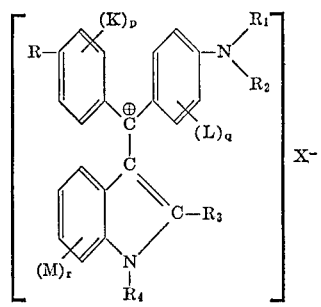

wherein

R is hydrogen; lower alkyl containing 1-5 carbon atoms; nitro; cyano; benzyl; phenyl; carboxylic acid methyl ester; carboxylic acid ethyl ester; unsubstituted carbonamido; substituted carbonamido containing N-substituents selected from the group consisting of lower alkyl, and lower alkyl substituted with Cl, Br, or OH; methylsulfonyl; ethylsulfonyl; phenylsulfonyl; p-toluene sufonyl; benzoyl; or acetyl;

$R_1$ and $R_2$ are both hydrogen; or $R_1$ is unsubstituted lower alkyl containing 1-5 carbon atoms; substituted lower alkyl containing 1-5 carbon atoms and substituted with Cl, Br or OH; benzyl, naphthyl; phenyl or phenyl substituted with Cl, Br, lower alkyl or lower alkoxy; and $R_2$ is unsubstituted lower alkyl containing 1-5 carbon atoms; substituted lower alkyl containing 1–5 carbon atoms and substituted with Cl, Br, OH, or CN; or benzyl;

$R_3$ is hydrogen, lower alkyl containing 1–5 carbon atoms; lower alkoxy; phenyl; phenyl substituted with chlorine, lower alkyl or lower alkoxy; or carboxylic acid methyl or ethyl ester;

$R_4$ is hydrogen, lower alkyl containing 1–5 carbon atoms; lower alkyl containing 1–5 carbon atoms substituted with CN; or benzyl;

K, L and M are independently selected from the group consisting of hydrogen; lower alkyl; lower alkoxy; nitro; Cl; and Br; or two of the substituents M are fused to form a naphthalene nucleus;

$p$, $q$ and $r$ are 1 or 2; and

X is a substantially colorless anion which does not impair the solubility of the dyestuff in an undesirable manner.

2. A dyestuff of claim 1 having the formula wherein

R′ is hydrogen or lower alkyl;

$R'_1$ is hydrogen, lower alkyl, benzyl, phenyl or phenyl substituted with one or two members selected from the class consisting of chlorine, bromine, lower alkyl and lower alkoxy;

$R'_2$ is hydrogen, lower alkyl or benzyl;

$R'_3$ is methyl, phenyl or phenyl substituted by one member selected from the class consisting of chlorine, bromine, lower alkyl and lower alkoxy;

$R'_4$ is hydrogen, lower alkyl or benzyl; and

Z is chlorine, bromine, lower alkyl or lower alkoxy;

X⁻ is an organic anion.

3. A dyestuff of claim 1 having the formula wherein

Z′ is hydrogen or chlorine;

R″₃ is methyl or phenyl;

R″₁ is hydrogen, lower alkyl, phenyl or lower alkoxy substituted phenyl;

R″₂ is hydrogen or lower alkyl; and $n$ is the number 0, 1, 2 or 3;

X⁻ is an organic anion.

4. The dyestuff of claim 1 having the formula

5. The dyestuff of claim 1 having the formula

6. The dyestuff of claim 1 having the formula

7. The dyestuff of claim 1 having the formula

8. The dyestuff of claim 1 having the formula

9. The dyestuff of claim 1 having the formula

10. The dyestuff of claim 1 having the formula
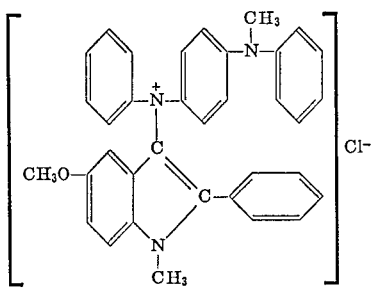
11. The dyestuff of claim 1 having the formula
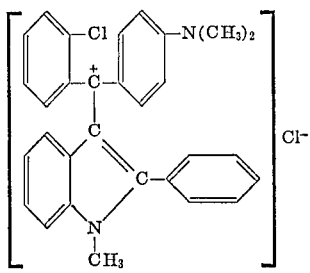
12. The dyestuff of claim 1 having the formula
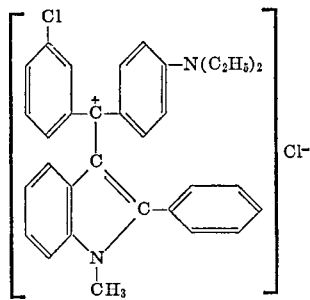
13. The dyestuff of claim 1 having the formula
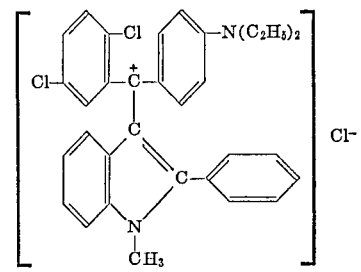
References Cited
UNITED STATES PATENTS
2,981,738   4/1961   Kranz _____ 260—308
FOREIGN PATENTS
290,065   7/1914   Germany.
295,495   3/1915   Germany.
632,448   5/1933   Germany.
ALEX MAZEL, Primary Examiner
J. A. NARCAVAGE, Assistant Examiner
U.S. Cl. X.R.
8—4, 12; 106—22; 260—40 R; 41 C; 88.7 B; 326.12 R; 326.13 R; 326.14 R

UNITED STATES PATENT OFFICE
CERTIFICATE OF CORRECTION

Patent No. 3,642,823              Dated February 15, 1972

Inventor(s) RAUE, ET AL.

It is certified that error appears in the above-identified patent and that said Letters Patent are hereby corrected as shown below:

The title should read --AMINODIPHENYL-INDOLYL-METHANE DYESTUFFS--.

| Column | Line | Error |
|---|---|---|
| 1 | Formula I | 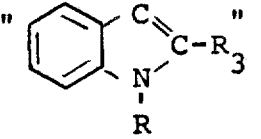 should read 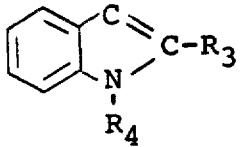 |
| 1 | 58 | "penyl" should be --phenyl--. |
| 2 | Formula III | " N " should read -- N --. <br> R,4        R'4 |
| 6 | Formula IX | "R" should read --$R_3$--. |
| 7 | Formula X | "R" should read --$R_3$--. |
| 10 | Table B 7 | "4-N-phenyl-methylaminophenyl-" should read -- 4-N-phenyl-N-methylaminophenyl- --. |
| 20 | 8 | "Hade on" should read --Shade on--. |
| 27 | 14 | "1-ethyl-2-phenyl-5-methylind" should read --1-ethyl-2-phenyl-5-methylindole--. |
| 29 | 48 and 75 | "$X^-$ is an organic anion" should read --$X^-$ is an inorganic or organic anion--. |
| 31 | Formula | "$-\overset{+}{\underset{C}{N}}-$" should read -- $-\overset{+}{\underset{C}{C}}-$ -- |

Signed and sealed this 22nd day of January 1974.

(SEAL)
Attest:

EDWARD M. FLETCHER, JR.            RENE D. TEGTMEYER
Attesting Officer                   Acting Commissioner of Patents